United States Patent
Sherony et al.

(10) Patent No.: US 11,702,805 B2
(45) Date of Patent: Jul. 18, 2023

(54) SURROGATE FOR CONCRETE CURB

(71) Applicants: Toyota Motor Engineering & Manufacturing North America, Inc., Plano, TX (US); The Trustees of Indiana University, Indianapolis, IN (US)

(72) Inventors: Rini Sherony, Ann Arbor, MI (US); Stanley Yung-Ping Chien, Zionsville, IN (US); Seeta Ram Pandey, Indianapolis, IN (US); Wensen Niu, Milpitas, CA (US); Yaobin Chen, Carmel, IN (US)

(73) Assignees: Toyota Motor Engineering & Manufacturing North America, Inc., Plano, TX (US); The Trustees of Indiana University, Indianapolis, IN (US)

( * ) Notice: Subject to any disclaimer, the term of this patent is extended or adjusted under 35 U.S.C. 154(b) by 614 days.

(21) Appl. No.: 16/701,850

(22) Filed: Dec. 3, 2019

(65) Prior Publication Data
US 2021/0164178 A1    Jun. 3, 2021

(51) Int. Cl.
*E01C 11/22*    (2006.01)
*E01F 15/04*    (2006.01)
*G01S 17/88*    (2006.01)

(52) U.S. Cl.
CPC ........ *E01F 15/0446* (2013.01); *E01C 11/221* (2013.01); *G01S 17/88* (2013.01)

(58) Field of Classification Search
CPC .................................................. E01F 15/081
See application file for complete search history.

(56) References Cited

U.S. PATENT DOCUMENTS 2,563,062 A * 8/1951 Perley .................. G01N 27/283
                                                                324/438
2,783,440 A * 2/1957 Lovick, Jr. ................ H01P 3/12
                                                                333/248

(Continued)

FOREIGN PATENT DOCUMENTS

CN        203420195 U      2/2014
CN        204875434 U      12/2015
(Continued)

OTHER PUBLICATIONS

Yi et al., "The Color Specification of Surrogate Roadside Objects for the Performance Evaluation of Roadway Departure Mitigation Systems", SAE International, published Apr. 3, 2018 (8 pages).

(Continued)

*Primary Examiner* — Gary S Hartmann
(74) *Attorney, Agent, or Firm* — Christopher G. Darrow; Darrow Mustafa PC

(57) ABSTRACT

Surrogates for roadside objects, such as concrete curbs, can be used for vehicle testing. A surrogate for a concrete curb can substantially be similar in size and/or shape as the concrete curb that the surrogate is mimicking. The surrogate can be configured to exhibit substantially the same characteristics as their actual counterpart concrete curb when sensed by one or more vehicle sensors (e.g., cameras, radar sensors, and/or LIDAR sensors). Such surrogates can be used to test automated vehicles, one or more vehicle sensors, a vehicle sensor system, and/or one or more vehicle system (e.g., a road departure mitigation system). The surrogates can be configured to withstand being impacted by a test vehicle without being damaged and without damaging the test vehicle.

24 Claims, 17 Drawing Sheets

(56) References Cited

U.S. PATENT DOCUMENTS

| | | | | |
|---|---|---|---|---|
| 2,943,205 | A * | 6/1960 | Kazan | H05G 1/30 361/175 |
| 2,952,761 | A * | 9/1960 | Smith-Johannsen | H01B 3/004 219/544 |
| 3,017,511 | A * | 1/1962 | Landsverkole | H01J 47/04 250/377 |
| 3,317,189 | A * | 5/1967 | Rubenstein | E01F 15/0453 52/DIG. 7 |
| 4,790,433 | A * | 12/1988 | Raszewsi | B29C 66/131 53/472 |
| 8,537,338 | B1 | 9/2013 | Medasani et al. | |
| 10,597,835 | B2 * | 3/2020 | Sherony | E01F 9/669 |
| 2013/0209780 | A1 * | 8/2013 | Poxson | C23C 16/487 204/192.1 |
| 2019/0309491 | A1 * | 10/2019 | Sherony | E01F 15/0446 |

FOREIGN PATENT DOCUMENTS

| | | | |
|---|---|---|---|
| CN | 109986678 | A | 7/2019 |
| CN | 110512484 | A * | 11/2019 |
| KR | 100871865 | B1 * | 12/2008 |
| KR | 20130011390 | A * | 1/2013 |

OTHER PUBLICATIONS

Lin, "Radar Characteristics Study for the Development of Surrogate Roadside Objects", Thesis, Purdue University, Dec. 2018 (132 pages).

* cited by examiner

| Color No. | RGB | LAB | Color Name |
|---|---|---|---|
| 1 | [187 178 152] | [7.0126 -0.0939 1.2361] | Grayish Orange or Akaroa |
| 2 | [216 173 64] | [7.0324 0.4493 5.0102] | Moderate Orange or Metallic Gold |
| 3 | [123 123 123] | [5.2072 0 0] | Dark Gray |
| 4 | [206 206 206] | [7.8734 0 0] | Mild Light Gray |
| 5 | [160 110 85] | [5.1659 1.4654 1.8989] | Dark Grayish Orange or Au Chico |
| 6 | [172 172 172] | [6.8135 0 0] | Gray |
| 7 | [141 140 135] | [5.7723 -0.0503 0.2400] | Mild Dark Gray or Suva Gray |
| 8 | [225 227 228] | [8.4998 -0.0418 -0.0616] | Light Grayish Blue or Zircon |
| 9 | [245 245 245] | [9.0469 0 0] | Very Light Gray or White Smoke |
| 10 | [103 103 103] | [4.5162 0 0] | Dark Gray |

| Color No. | Color Name | Group 1 (% of color) | Group 2 (% of color) | Group 3 (% of color) | Group 4 (% of color) |
|---|---|---|---|---|---|
| 1 | Grayish Orange or Akaroa | | 12.5% | 53% | |
| 2 | Moderate Orange or Metallic Gold | | 56.25% | | |
| 3 | Dark Gray | | | | |
| 4 | Mild Light Gray | 12% | | | |
| 5 | Dark Grayish Orange or Au Chico | | 6.25% | 18% | 4.25% |
| 6 | Gray | | 25% | | 76% |
| 7 | Mild Dark Gray or Suva Gray | | | | 17.75% |
| 8 | Light Grayish Blue or Zircon | 66% | | | |
| 9 | Very Light Gray or White Smoke | 21% | | 29% | 2% |
| 10 | Dark Gray | 1% | | | |

FIG. 4B

| Pattern No. | Pattern Name | Color Distribution |
|---|---|---|
| 1 | Group1_Pattern1 | Color no. 8 as base.<br><br>Color no. 9 as dense spots, color no. 4 as dense spots, and color no. 10 as sparse spots |
| 2 | Group1_Pattern2 | Color no. 8 as base.<br><br>Color no. 9 as dense spots, color no. 4 as sparse spots, and color no. 10 as sparse spots |
| 3 | Group3_Pattern3 | Color no. 1 as base.<br><br>Color no. 5 as dense spots, and color no. 6 as dense spots |
| 4 | Group4_Pattern4 | Color no. 6 as base.<br><br>Color no. 7 as dense spots, color no. 5 as dense spots, and color no. 9 as sparse spots |
| 5 | Group4_Pattern5 | Uniform color no. 6 |

SURROGATE FOR CONCRETE CURB

PARTIES TO A JOINT RESEARCH AGREEMENT

The presently claimed invention was made by or on behalf of the below listed parties to a joint research agreement. The joint research agreement was in effect on or before the date the claimed invention was made, and the claimed invention was part of the joint research agreement and made as a result of activities undertaken within the scope of the joint research agreement. The parties to the joint research agreement are TOYOTA MOTOR ENGINEERING & MANUFACTURING NORTH AMERICA, INC. and THE TRUSTEES OF INDIANA UNIVERSITY.

FIELD

The subject matter described herein relates in general to vehicles and, more particularly, to the testing of vehicle systems.

BACKGROUND

When a vehicle departs from a road, the situation can quickly become extremely dangerous. For instance, there are various roadside objects that a vehicle can collide with, and/or the vehicle may be prone to rollover. Some vehicles are equipped with a road departure mitigation system, and it is expected that the use of such systems will increase in the future. A road departure mitigation system can detect when a vehicle is about to leave the road. In such case, the road departure mitigation system can provide a warning to the driver and/or can automatically control one or more vehicle systems (e.g., steering and/or braking) to prevent the vehicle from departing the road.

SUMMARY

In one respect, the subject matter described herein is directed to a concrete curb surrogate. The concrete curb surrogate includes a body. The body can be configured to be substantially the same size and shape as a body of a concrete curb. The body can include a core and a skin attached to the core. The skin can cover at least a portion of the core. The skin can include a plurality of layers. The plurality of layers can include at least a first layer and a second layer. The first layer can include a mixture of paint and cement, and the second layer can include a conductive material. Thus, the skin can be configured to exhibit substantially the same characteristics as the concrete curb relative to one or more vehicle sensors (e.g., camera(s), radar sensor(s), and/or LIDAR sensor(s)).

In another respect, the subject matter described herein is directed to a surrogate for a concrete curb for use in vehicle testing. The surrogate can include a body configured to be substantially the same size and shape as a body of a concrete curb. The body can include a core and a skin attached to the core. The core include a non-concrete material, such as a foam material. The skin can cover at least a portion of the core. The skin can include at least three layers. The at least three layers can include a first layer, a second layer, and an intermediate layer located between the first layer and the second layer. The first layer can include a mixture of paint and cement. The first layer can be an outermost layer of the skin. The second layer can include a conductive material. Thus, the skin can be configured to exhibit substantially the same characteristics as the concrete curb relative to one or more vehicle sensors (e.g., camera(s), radar sensor(s), and/or LIDAR sensor(s)).

BRIEF DESCRIPTION OF THE DRAWINGS

FIG. 4B is a table of various example color groupings for the skin of the concrete curb surrogate.

FIG. 4C is a table of various example paint patterns for the skin of the concrete curb surrogate.

DETAILED DESCRIPTION

Figure 1:
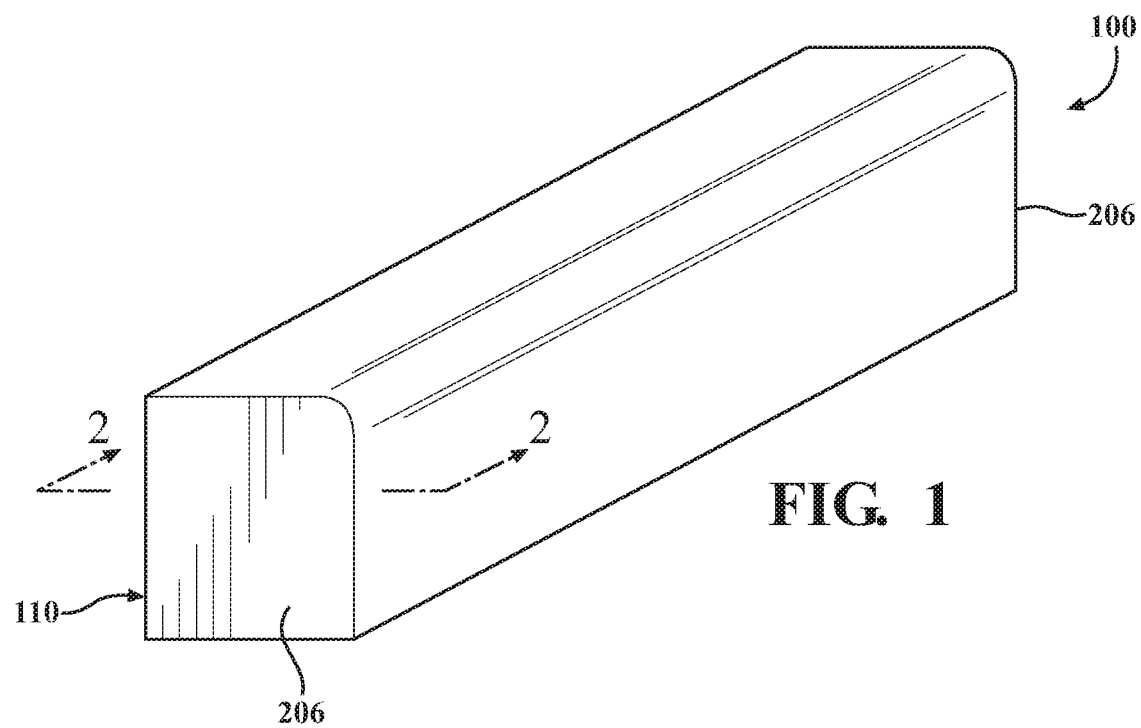
FIG. 1 is a view of an example of a concrete curb surrogate.

According to arrangements herein, surrogates are provided for one or more roadside objects, such as a concrete curb. These surrogates can approximate the overall visual appearance of the corresponding roadside object, and they can mimic the characteristics of the corresponding roadside object relative to vehicle sensors. These surrogates can be used in the testing of vehicles, such as automated vehicles and/or vehicles with a road departure mitigation system.

The surrogates can be relatively lightweight, soft, and sturdy. The surrogates can be configured to be crashed into by a vehicle without damaging the test vehicle. The surrogates can also be configured to be crashed into by a vehicle without damaging the surrogate in many cases. However, it will be appreciated that, in at least some instances, damage to the surrogate may occur if it is repeatedly crashed into by a vehicle (assuming it is not run over by the vehicle) and/or if it is crashed into by a vehicle at high speeds. The surrogates can have substantially the same size and/or shape as the roadside objects that they are being used as a substitute. In some instances, at least a portion of the surrogates can be configured to separate after being impacted by a vehicle. The surrogates can be configured to be reset for use within a period of time, such as 1 minutes or less per meter of the length of the surrogate.

The surrogates can be configured to exhibit substantially the same characteristics to one or more vehicle sensors (e.g., cameras, radar sensors, LIDAR sensors, etc.) as their corresponding roadside object. For example, the surrogates can have substantially the same visual appearance (e.g., color, size, and shape) as the corresponding roadside object. In this respect, the surrogate can appear substantially same to vehicle cameras as the actual corresponding roadside object. Further, the surrogates can exhibit substantially the same radar reflectivity and/or radar cross-section as the corresponding roadside object. In one or more arrangements, the surrogates can exhibit substantially the same radar cross-section for 24 GHz radar and/or for 77 GHz radar as the corresponding roadside object. For a concrete curb surrogate, the radar reflectivity of a skin of the concrete curb surrogate can be substantially the same as a corresponding real concrete curb for 24 GHz and/or 77 GHz radar. In one non-limiting example, the radar reflectivity of a skin of the concrete curb surrogate can be −7.30±1 dB for 24 GHz and/or 77 GHz radar. However, it will be understood that the radar reflectivity of a skin of the concrete curb surrogate may have other values for both 24 GHz and 77 GHz radar, depending on the particular concrete curb that is being mimicked by the surrogate. Thus, the surrogate can appear substantially the same to a radar sensor as the corresponding roadside object. Still further, the surrogates can exhibit substantially the same infrared reflectivity as the corresponding roadside object. More particularly, the surrogates can exhibit substantially the same infrared reflectivity as the corresponding roadside object at various reflectance angles, such as a reflectance angle of from substantially 20 degrees to substantially 70 degrees (where 0 degree is the direction normal to the object surface). The surrogate can appear substantially the same to a LIDAR sensor as the corresponding roadside object.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of embodiments and aspects herein. Arrangements are shown in FIGS. 1-8, but the embodiments are not limited to the illustrated structure(s) or application(s).

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features. In addition, numerous specific details are set forth in order to provide a thorough understanding of the embodiments described herein. However, it will be understood by those of ordinary skill in the art that the embodiments described herein can be practiced without these specific details.

One example of a roadside object in which arrangements described herein can be used is a curb. Typically, curbs are used in places where surfaces at different elevations meet. For instance, curbs can be used at a junction where a raised portion of land or material meets an unraised portion of land or material. For instance, curbs can be at the interface between land and a paved surface. However, some curbs can be raised sections between two unraised portions of land or material. Curbs can serve a variety of functions. For instance, curbs can provide borders for roads or paths, support for portions of raised materials, aesthetic appeal, and/or provide safety or directional means for pedestrians and vehicles. Curbs may also provide feature to facilitate drainage. The use of curbs is relatively abundant on roads throughout the world. Curbs can be made of one or more materials, such as concrete.

Figure 2:
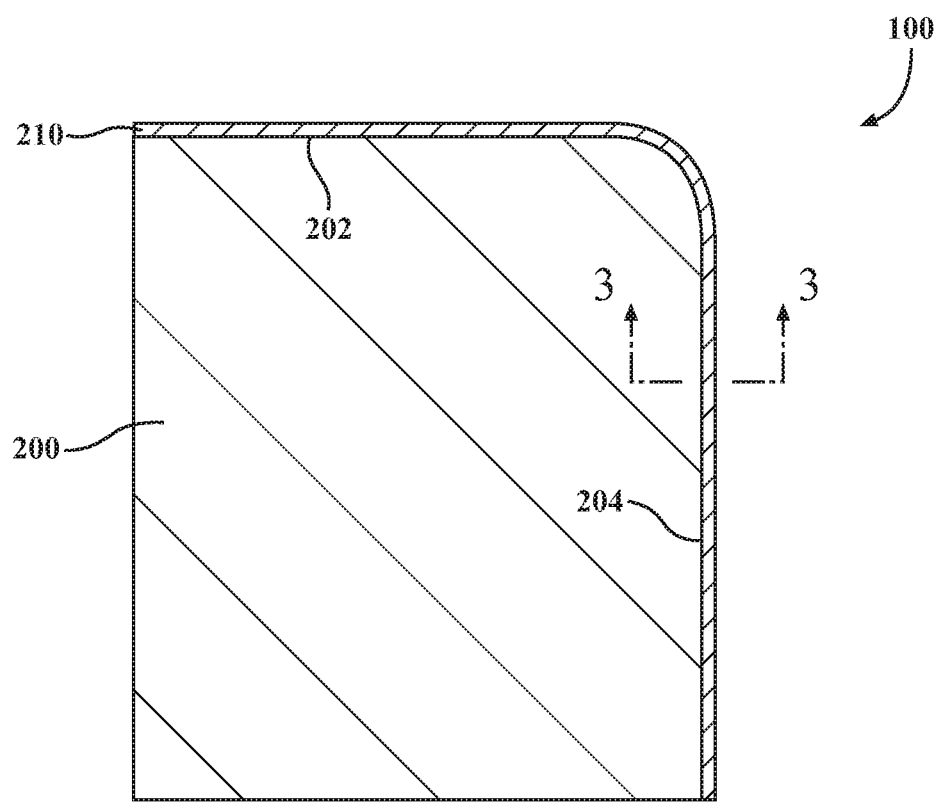
FIG. 2 is a cross-sectional view of the concrete curb surrogate, viewed along line 2-2 in FIG. 1 and showing a core and a skin.

In one or more arrangements, a surrogate for a concrete curb can be provided. An example of a curb surrogate 100 is shown in FIGS. 1-2. The curb surrogate 100 can have substantially the same size, shape, and/or configuration as any curb, now known or later developed. The curb surrogate 100 can have a body 110. The body 110 can have any suitable cross-sectional shape. In one or more arrangements, the body 110 can be substantially rectangular. One or more corners of the curb surrogate 100 can be rounded. FIG. 2 shows an example in which the curb surrogate 100 includes a rounded corner 120.

The curb surrogate 100 can have any suitable size. For example, in one or more arrangements, the curb surrogate 100 can have a height of about 6 inches, a width of about 6 inches, and a length of about 72 inches. The rounded corner 120 can have a radius from about 1 inch to about 4 inches. In one or more arrangements, the rounded corner 120 can have a radius of about 1.5 inches.

However, it will be understood that the curb surrogate 100 can have other shapes corresponding to the shapes of other curbs, such as substantially trapezoidal, substantially polygonal, substantially quadrilateral, substantially semi-circular, substantially L-shaped, or irregular shaped, or any combination thereof. The curb surrogate 100 can have a shape specified by any previous, current, or future standard. The standard can be a local, city, state, national/federal, or international standard. The curb surrogate 100 can have a shape specified by any previous, current, or future Department of Transportation (U.S. or state) standard.

It should be noted that the curb surrogate 100 can extend in a substantially straight manner along its length, as is shown in FIG. 1. However, it will be appreciated that, in some arrangements, the curb surrogate 100 can include curves, bends, or other non-straight feature along at least a portion of its length. In some instances, the curb surrogate 100 may include features associated with actual curbs, such as drainage features (e.g., gutters).

Referring to FIG. 2, the body 110 can include a core 200 and a skin 210. The core 200 can be made of a relatively soft, sturdy, and/or lightweight material. The core 200 can define the overall shape of the curb surrogate 100. For instance, the core 200 can be made of a foam material. As an example, the core 200 can be made of polyethylene foam. As an example, the core 200 can be made of 2 lb/ft$^3$ cross-linked polyethylene foam. The core 200 can be made of a non-concrete material.

The skin 210 can be configured to cause the curb surrogate 100 to satisfy the requirements of one or more vehicle sensors. For instance, the skin 210 can be configured to satisfy requirements for LIDAR sensors, radar sensors, and/or cameras of a vehicle. Thus, relative to the one or more vehicle sensors, the curb surrogate 100 can appear substantially the same as the real world curb that the curb surrogate 100 is mimicking. The skin 210 can also serve as a protective layer to the core 200, such as when the curb surrogate 100 is crashed into by a vehicle during testing. The skin can minimize damage to the foam due to sun exposure.

At least a portion of the core 200 can be substantially covered by the skin 210. In one or more arrangements, the entire core 200 can be covered by the skin 210. In one or more arrangements, only a portion of the core 200 can be covered by the skin 210. For example, as shown in FIG. 2, only an upper surface 202 and a road-facing surface 204 of the core 200 visible to the test vehicle can be covered by the skin 210. The terms "upper" and "road-facing" are used in this respect for convenience to note the relative position of these surfaces when the curb surrogate 100 is used in an intended operational position. However, it will be understood that these terms are not intended to be limiting. The longitudinal ends 206 of the core 200 may or may not be covered by the skin 210.

The skin 210 can be made of one or more layers. In one or more arrangements, the skin 210 can be made of a single layer. In one or more arrangements, the skin 210 can include a plurality of layers.

The skin 210 can include various materials. Non-limiting examples of such materials include polycarbonate, non-metallic fabric (e.g., polyester fabric, a cotton fabric, a nylon fabric, etc.), paint (e.g., acrylic paint, organic paint, a conductive paint, etc.), cement (e.g., Portland cement), other materials, and any combination thereof. The materials can be arranged in various ways within the skin 210.

Some examples of the skin 210 will now be provided. In one or more examples, the skin 210 can include a plurality of layers. For instance, referring to FIG. 3, the skin 210 can include three layers: a first layer 220, a second layer 230, and an intermediate layer 240 between the first layer 220 and the second layer 230. However, it will be appreciated that there can be greater or fewer than three layers. In one or more arrangements, the first layer 220 can be an outermost layer of the skin 210, and the second layer 230 can be an innermost layer of the skin 210. The terms "outermost" and "innermost" are used for convenience relative to the core 200 of the curb surrogate 100. Each of the layers will be discussed in turn below.

The first layer 220 of the skin 210 can be formed by one or more materials. In one or more arrangements, the first layer 220 can be formed by a mixture of paint and cement. As an example, the first layer 220 can include concrete colored paint mixed with Portland cement. These materials can be mixed at any suitable ratio. In one or more arrangements, the amount of paint can be substantially greater than the amount of cement. For instance, the ratio of paint to cement can be about 32:1.

In some arrangements, the first layer 220 can include at least one of concrete colored paint and one or more chemical components of Portland cement. Examples of the chemical components of Portland cement can be found in any past, current, or future standard defining Portland cement. For instance, Portland cement is defined in the following standards: ASTM C150 (ASTM International) and EN 197-1 (European Committee for Standardization), which are incorporated herein by reference.

The first layer 220 can have any suitable thickness. As an example, the first layer 220 can have a thickness of about 50 μm to about 100 μm and, more particularly, about 50 μm to about 60 μm. In some arrangements, the materials of the first layer 220 can satisfy the LIDAR, radar and/or camera requirements of the curb surrogate 100.

The intermediate layer 240 can be made of any suitable material to provide strength to the skin 210, such as when crashed into by a vehicle. In one or more arrangements, the intermediate layer 240 can include polycarbonate. For instance, the intermediate layer 240 can be formed by a polycarbonate film. The polycarbonate film can be a matte polycarbonate film to facilitate paint attachment. That is, at least one of the sides of the polycarbonate film can have a matte finish. In one or more arrangements, both sides of the polycarbonate film can have a matte finish. In one or more arrangements, the intermediate layer can be made of a nonmetallic fabric material. For example, the intermediate layer 240 can be made of polyester fabric, a cotton fabric, a nylon fabric, or combinations thereof. The intermediate layer 240 can have any suitable thickness. For instance, the intermediate layer 240 can have a thickness of about 475 μm or about 0.02 inches.

The second layer 230 can be made of any suitable material. In one or more arrangements, the second layer 230 can include a conductive material. For example, the second layer 230 can include a conductive paint (e.g., conductive carbon paint). Some arrangements, the second layer 230 can be a mixture of conductive paint and organic, non-conductive paint. These paints can be mixed at any suitable ratio. In one or more arrangements, the ratio of organic paint to the conductive paint can be about 8:1. In some implementations, two or more coats of this paint mixture can be applied.

In one or more arrangements, the second layer 230 can include a conductive fabric. In one or more arrangements, the second layer 230 can include a conductive film. In one or more arrangements, the second layer 230 can include a conductive foam. In one or more arrangements, the second layer 230 can be defined by the core 200 or a portion of the core 200. For instance, when the core 200 is made of foam, the foam can be conductive or made to be conductive. In some arrangements, a portion of the foam of the core 200 can be conductive or made to be conductive.

The second layer 230 can have any suitable thickness. For instance, the second layer 230 can have a thickness of about 50 μm to about 100 μm and, more particularly, about 50 μm to about 60 μm. The second layer 230, alone or in combination with the intermediate layer 240, can help in satisfying the radar sensor requirement. The thickness of the layers can be adjusted to satisfy radar requirements.

The skin 226 can be attached to the core 224 in any suitable manner. For instance, the skin 226 can be attached to the core 224 by one or more adhesives and/or one or more fasteners. In one or more arrangements, the skin 226 can be attached to the core 224 using tape. In one or more arrangements, the skin 226 can be attached to the core 224 using hook and loop type fasteners (e.g., Velcro).

Figures 3, 4A:
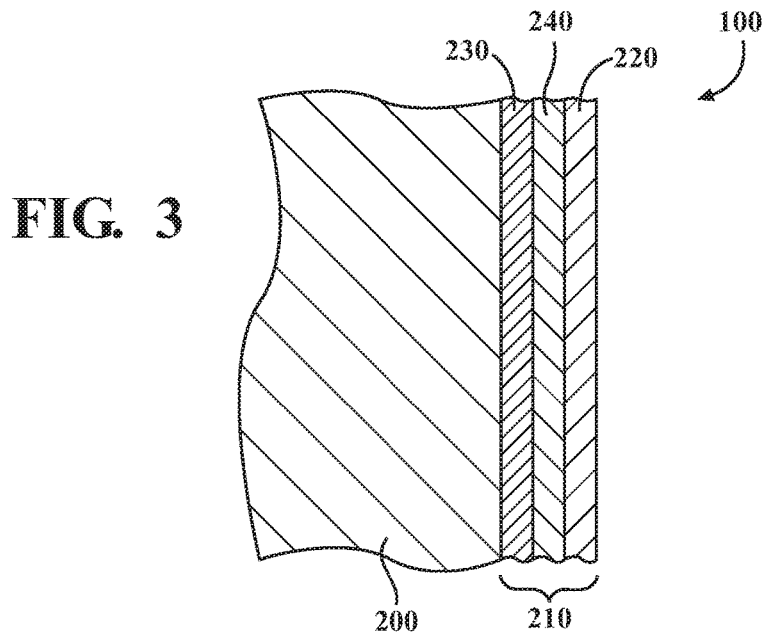
FIG. 3 is a cross-sectional view of the concrete curb surrogate, viewed along line 3-3 in FIG. 2 and showing a multi-layer skin.
FIG. 4A is a table of various example paint colors for the skin of the concrete curb surrogate.
Figure 5A:
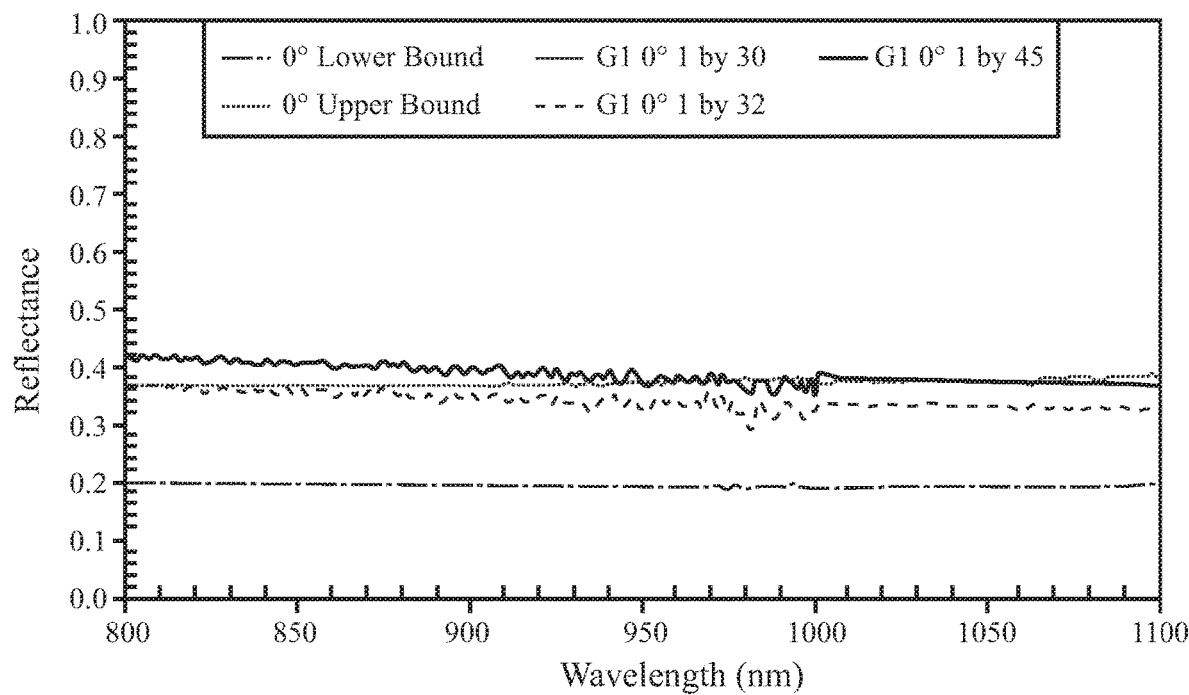
FIGS. 5A-H show the infrared reflectance of a concrete curb surrogate at various detection angles for a first color group and for different cement to paint ratios in an outermost layer of the skin.
Figure 5B:
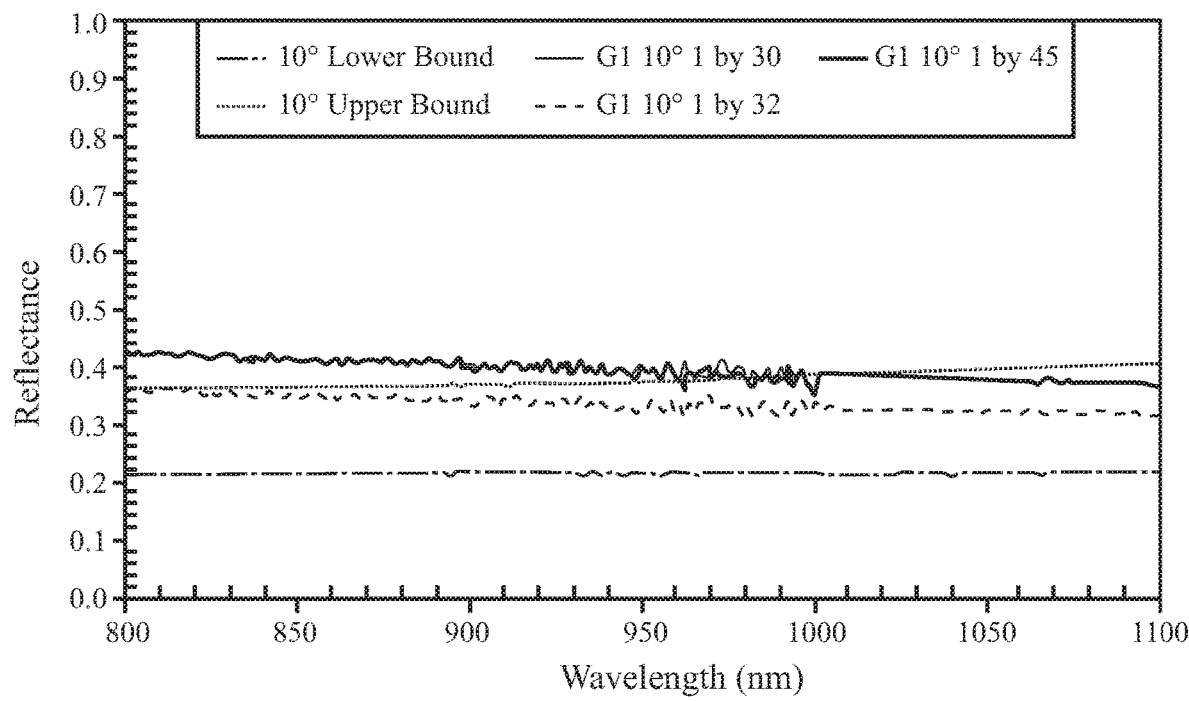
Figure 5C:
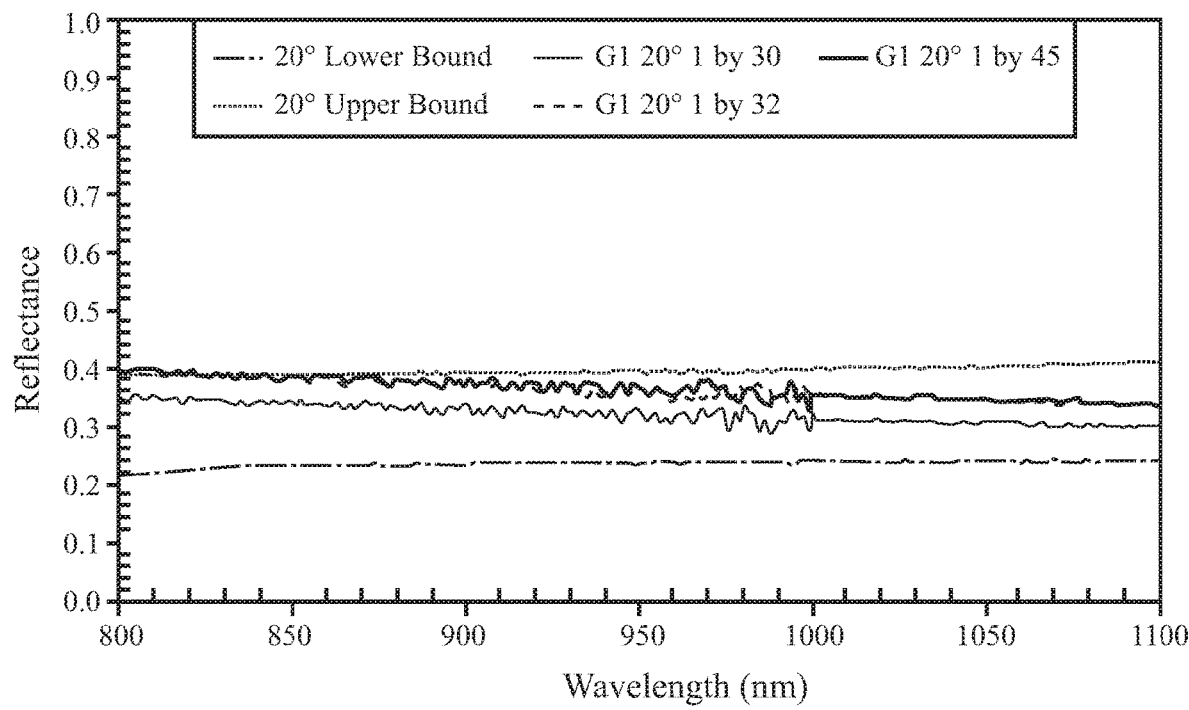
Figure 5D:
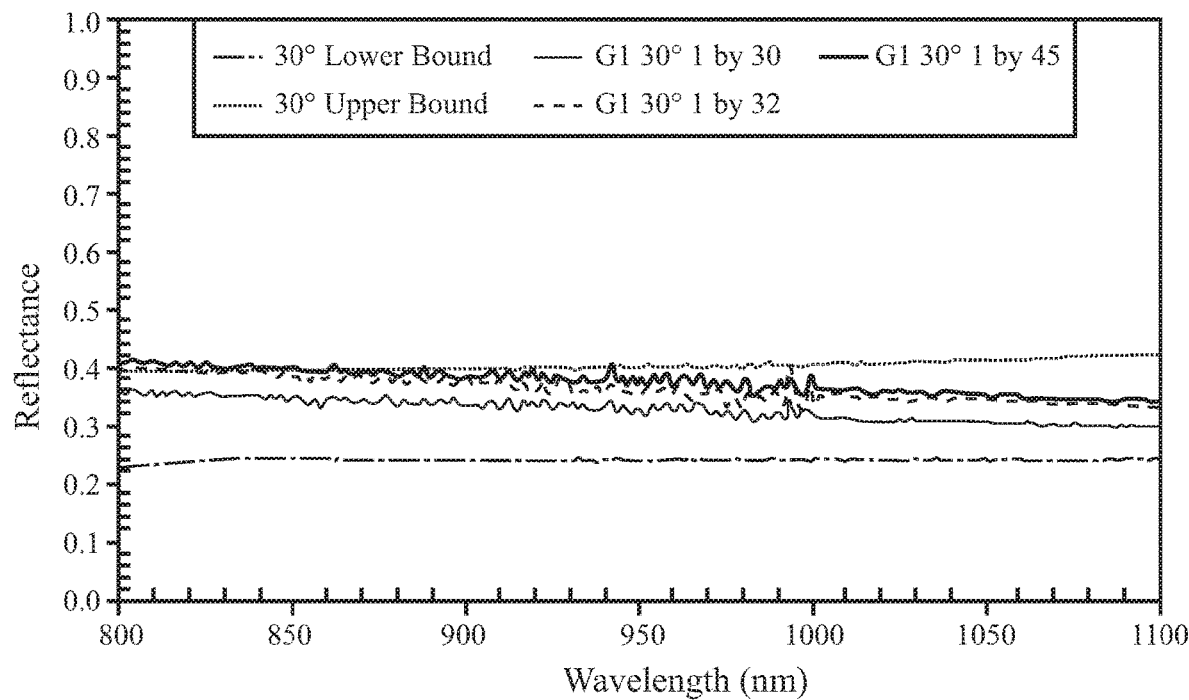
Figure 5E:
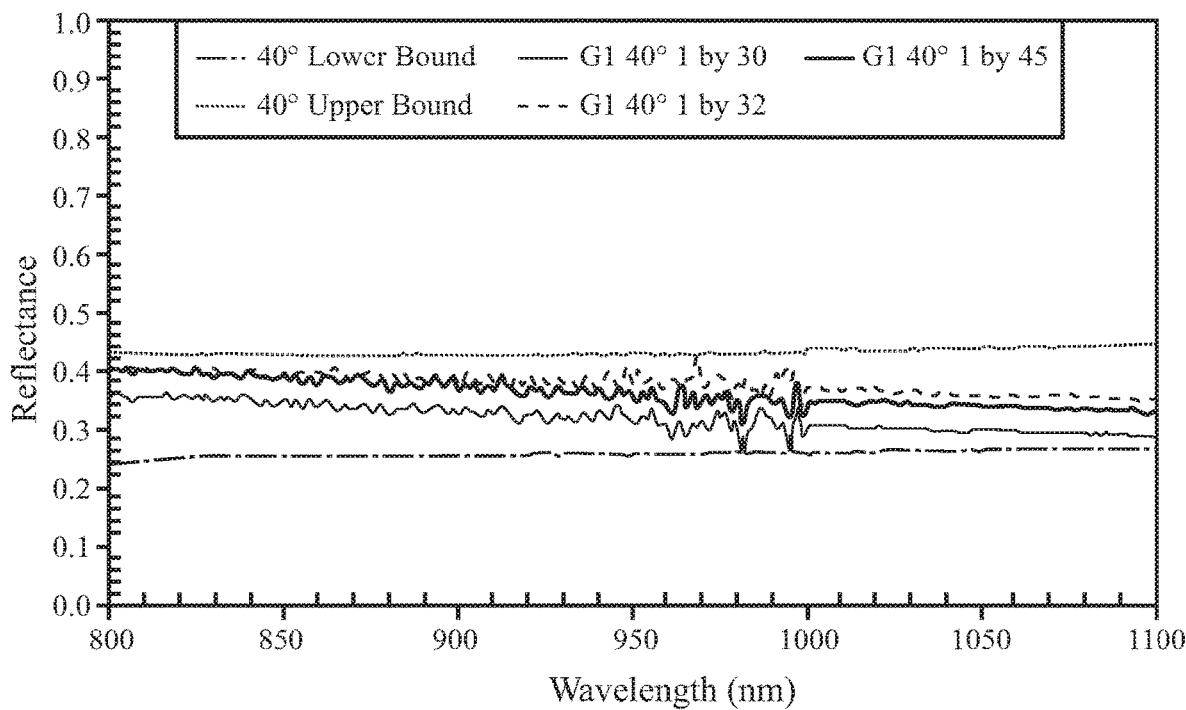
Figure 5F:
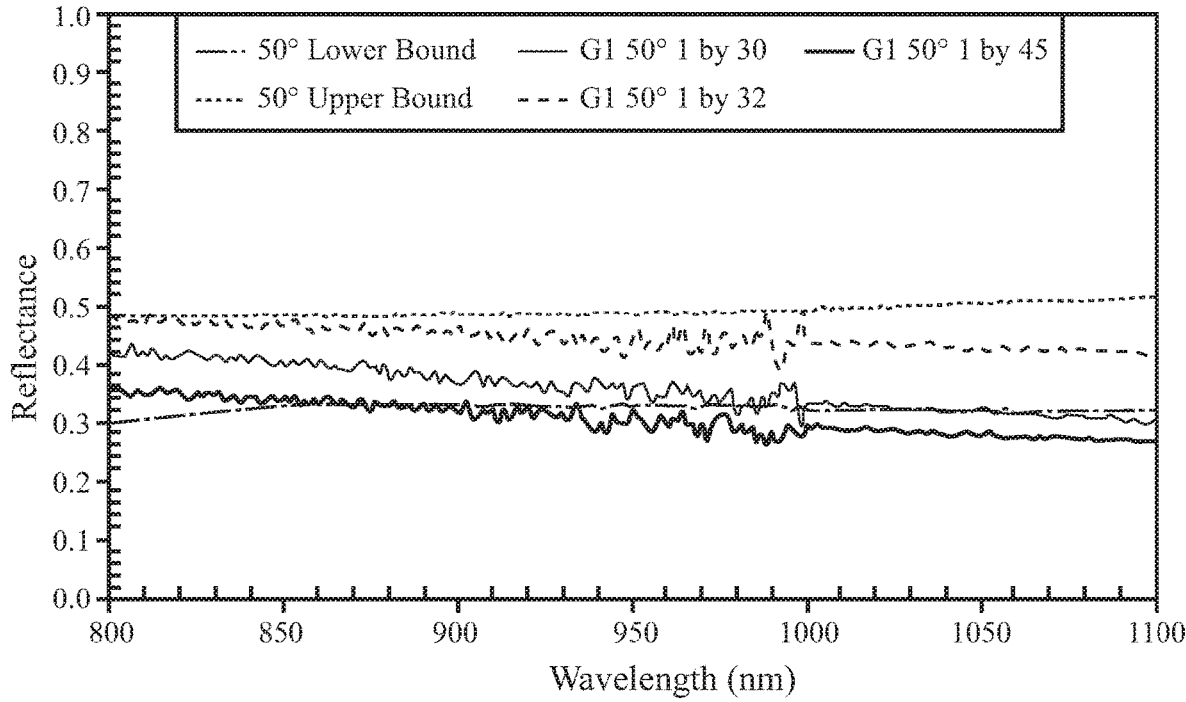
Figure 5G:
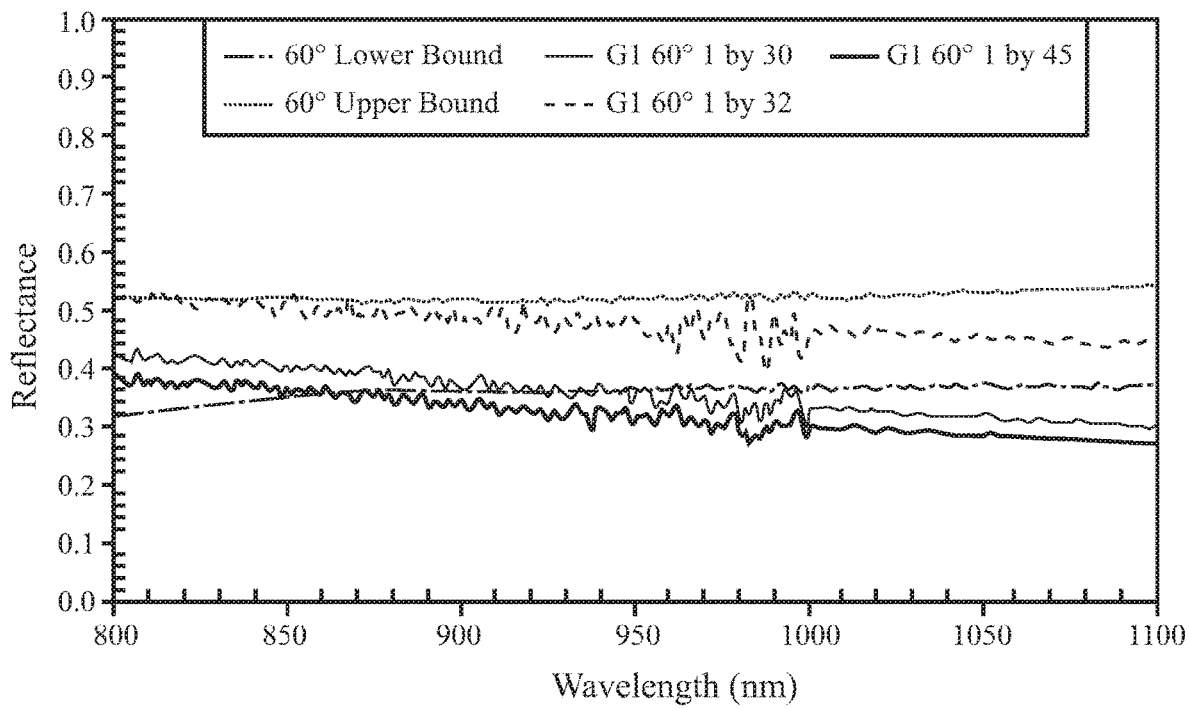
Figure 5H:
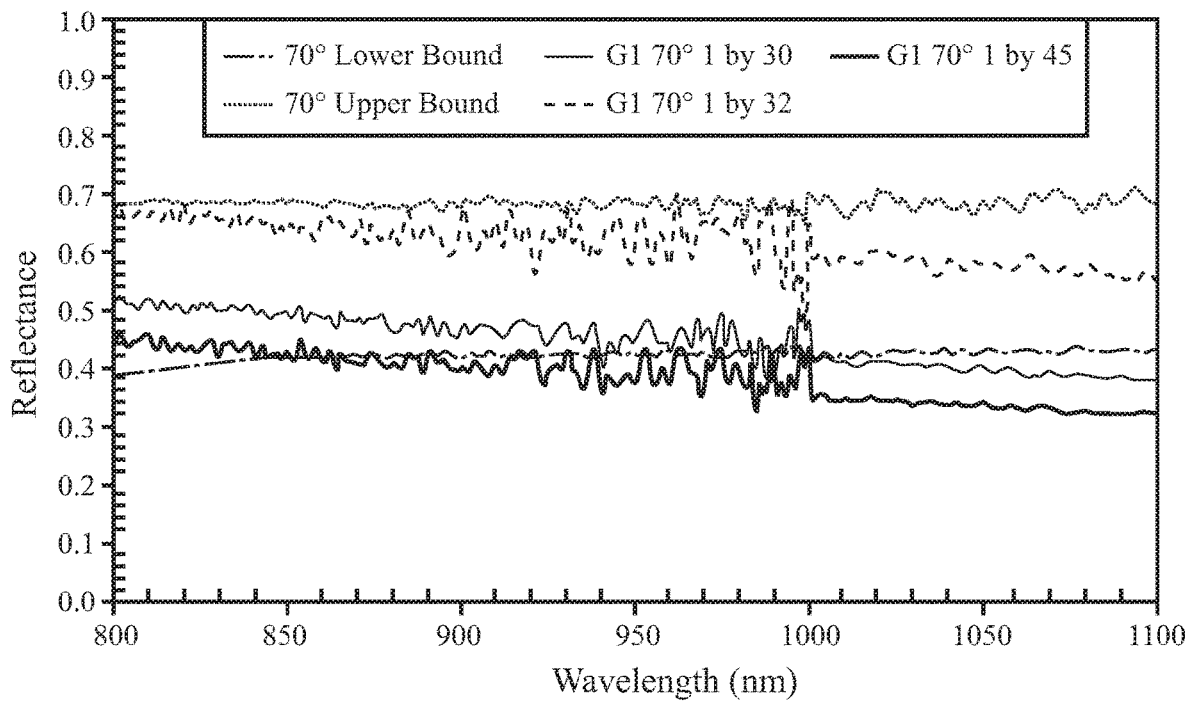
Figure 6A:
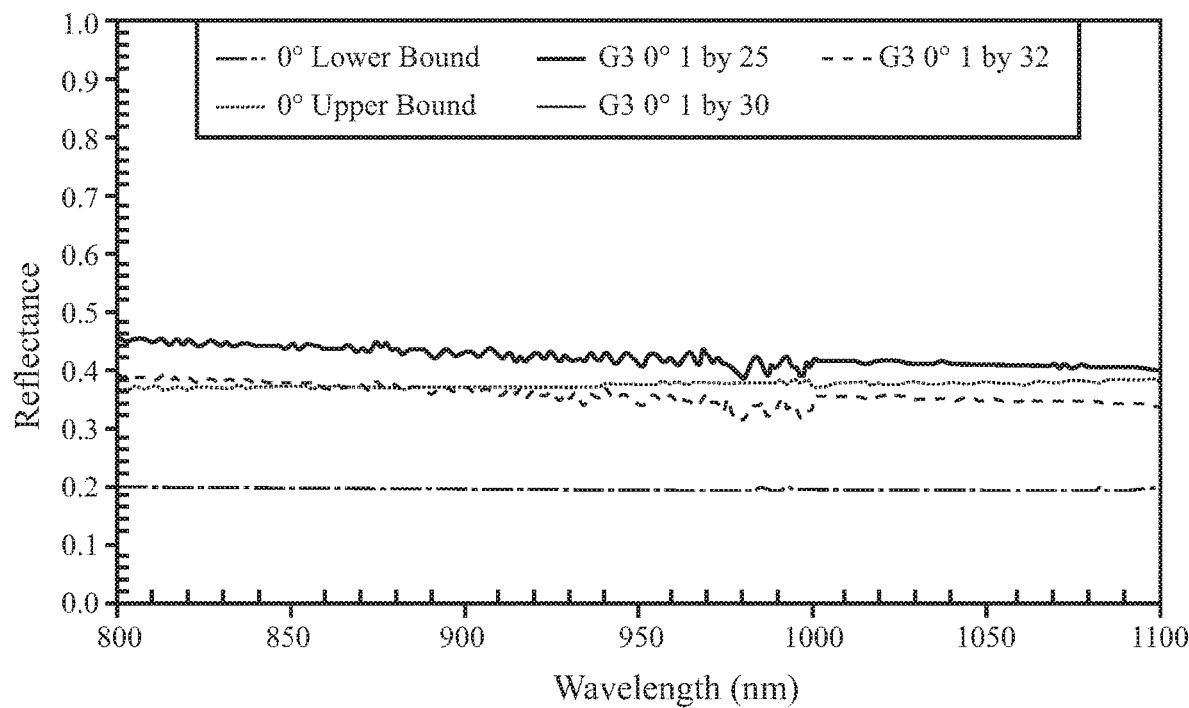
FIGS. 6A-H show the infrared reflectance of a concrete curb surrogate at various detection angles for a second color group and for different cement to paint ratios in an outermost layer of the skin.
Figure 6B:
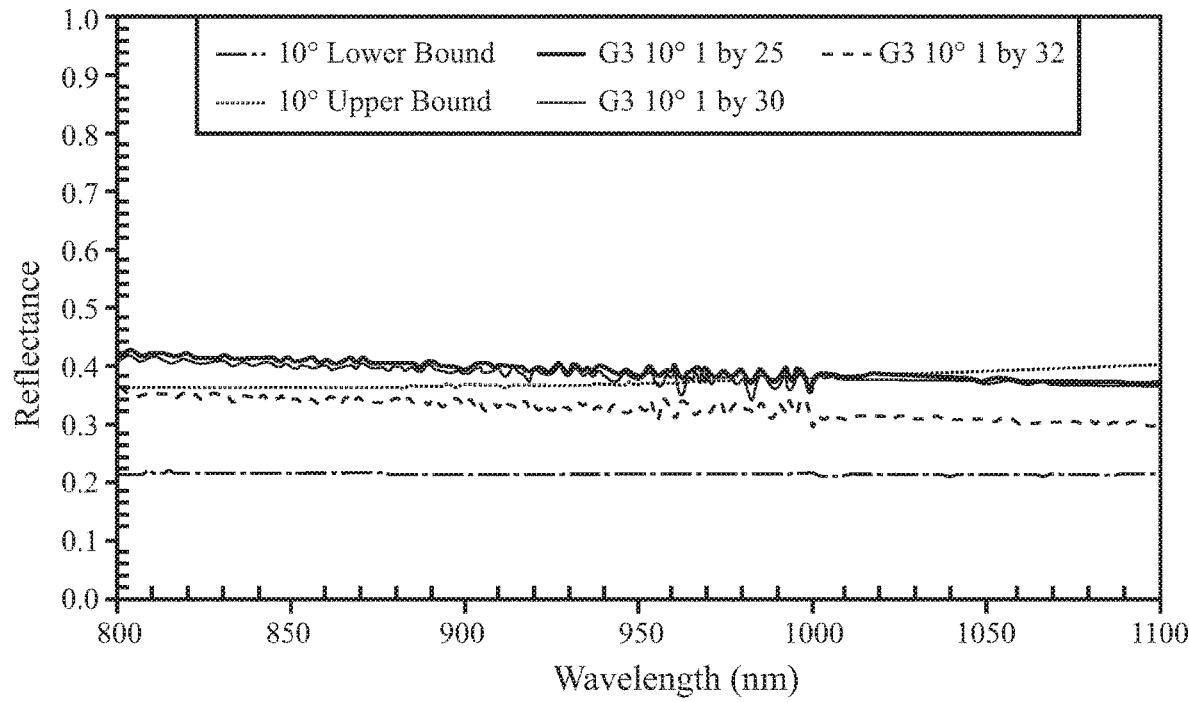
Figure 6C:
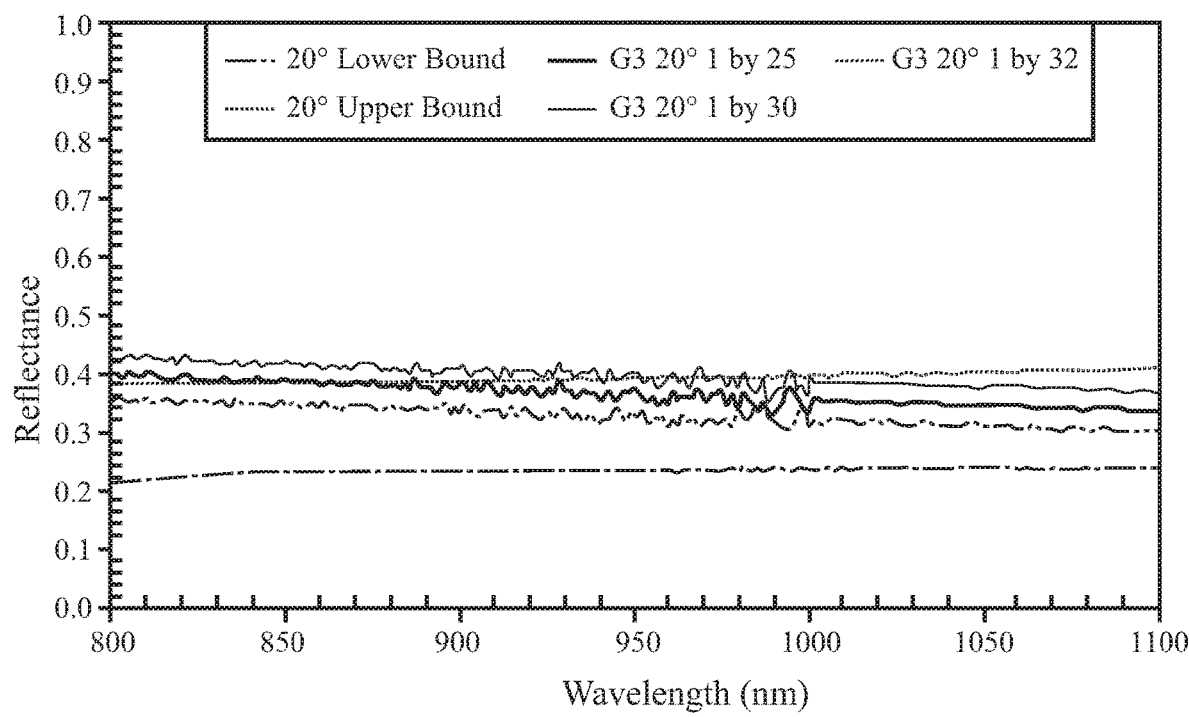
Figure 6D:
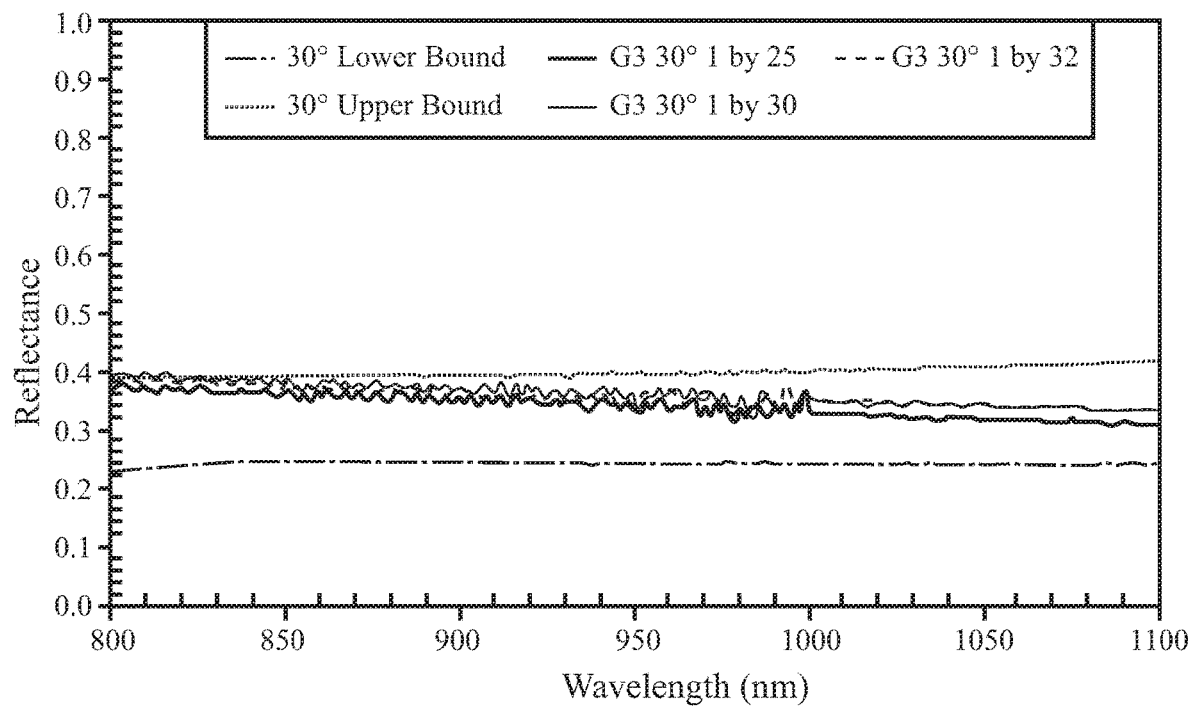
Figure 6E:
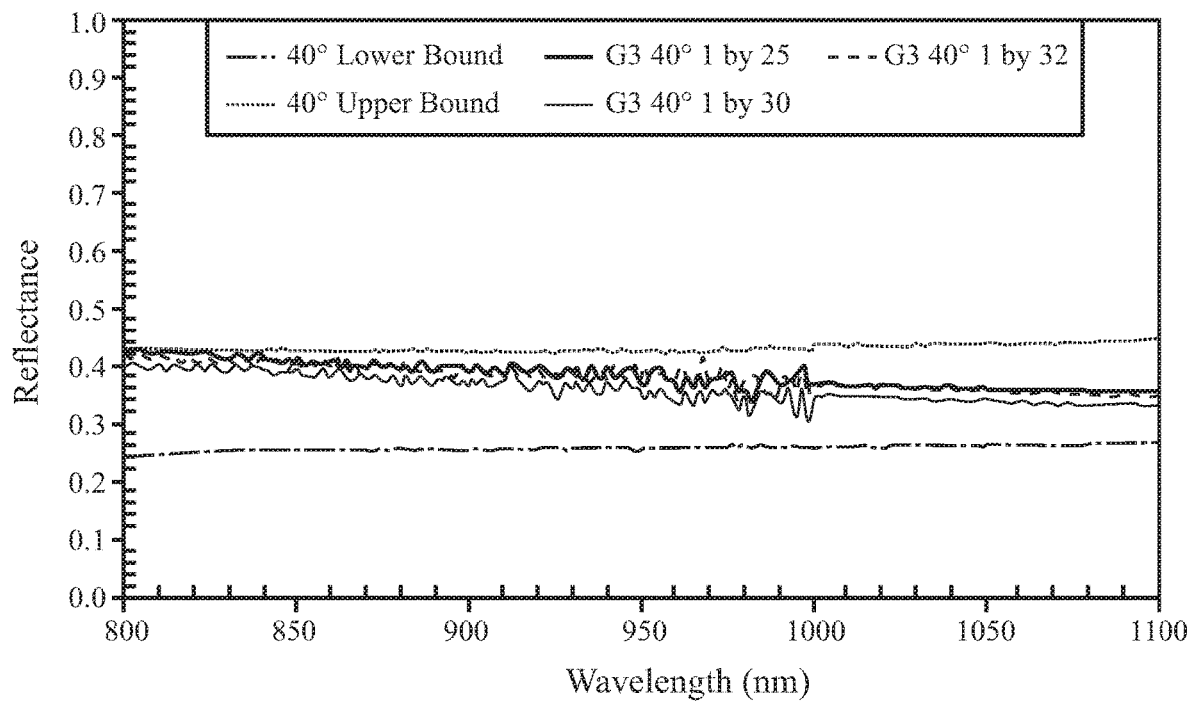
Figure 6F:
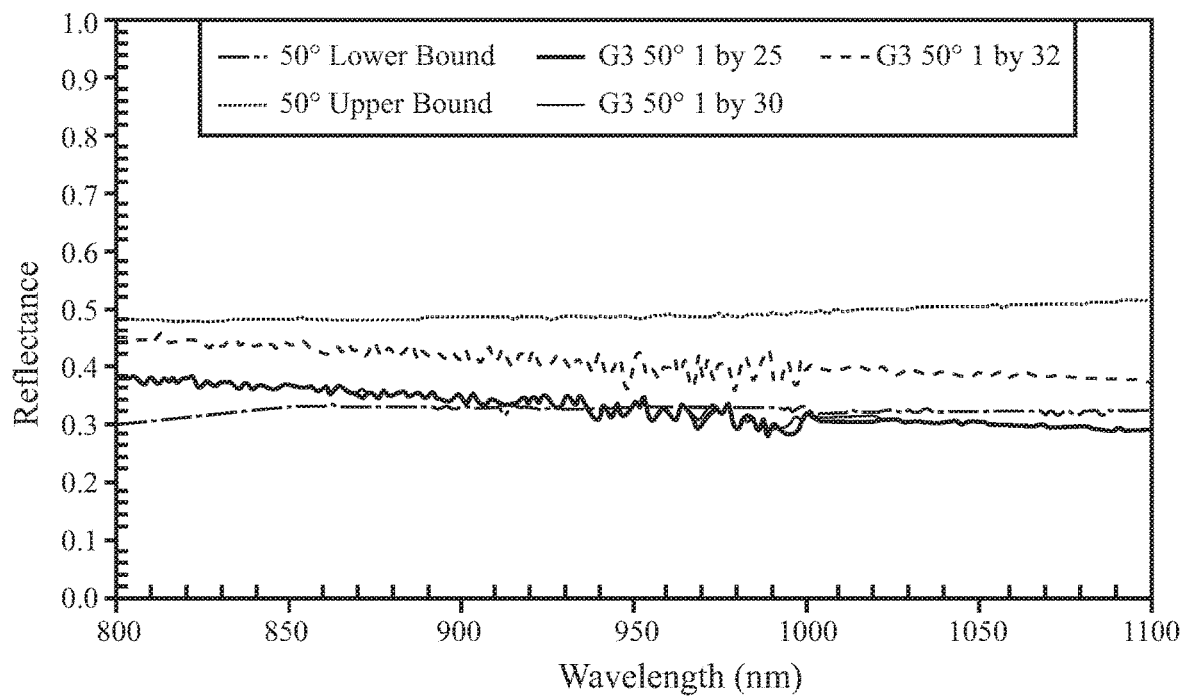
Figure 6G:
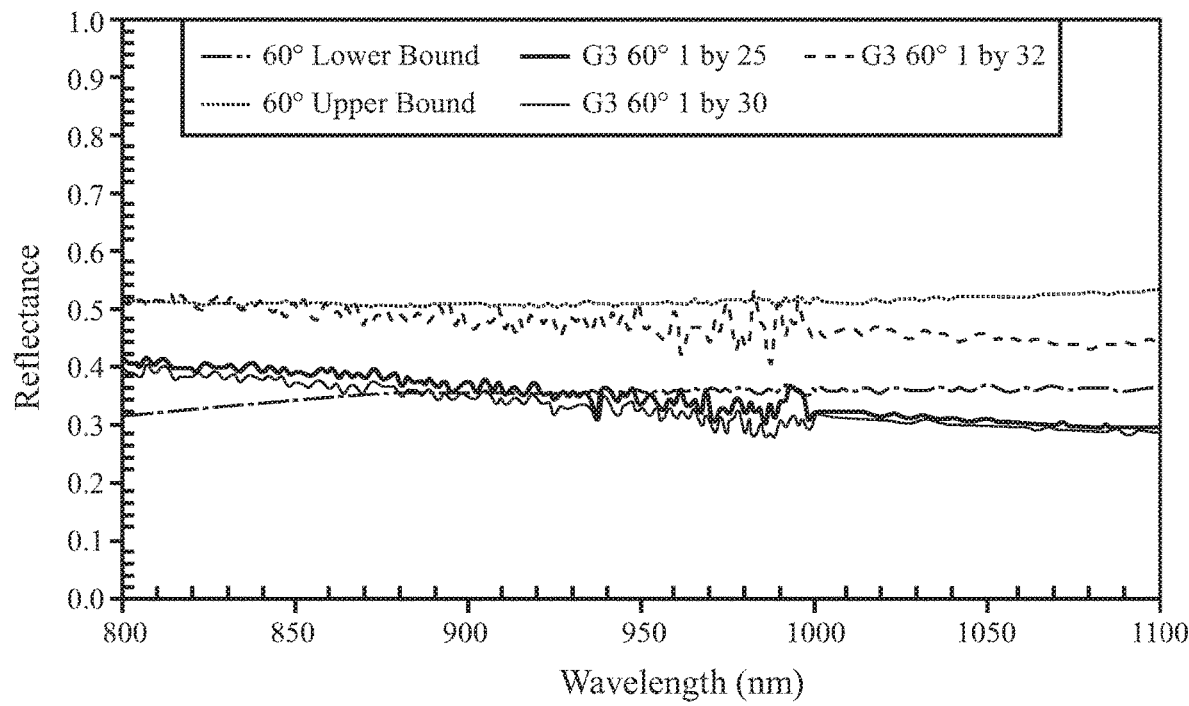
Figure 6H:
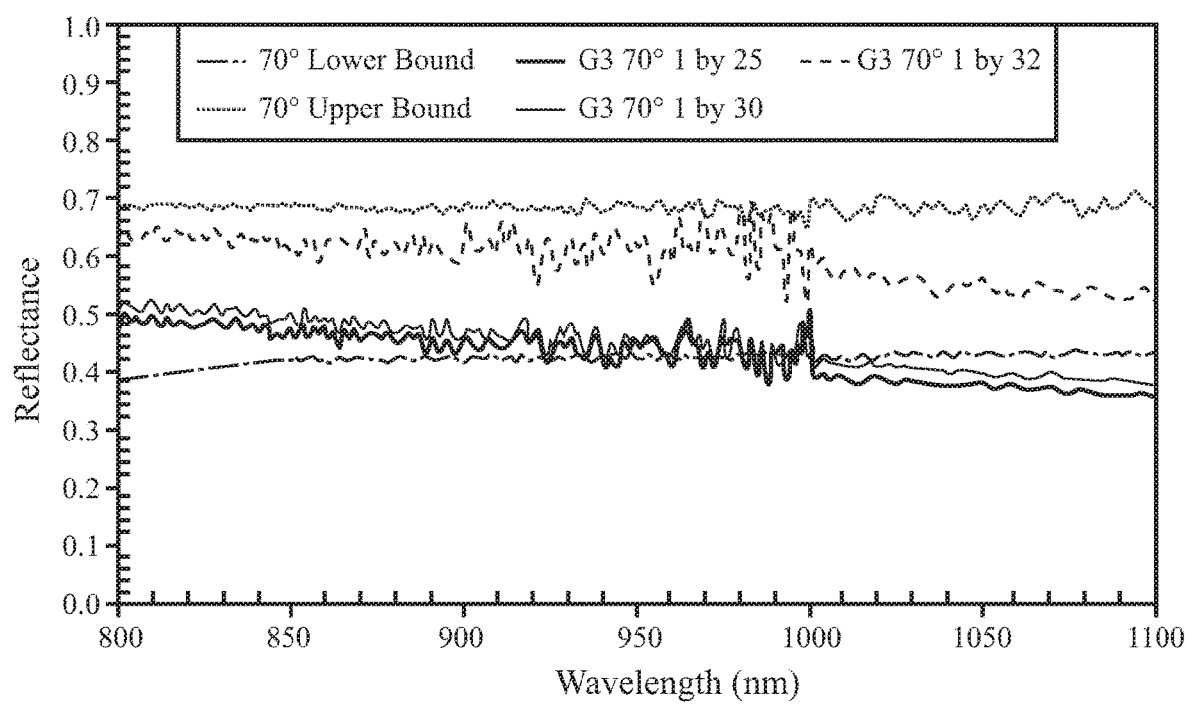
Figure 7A:
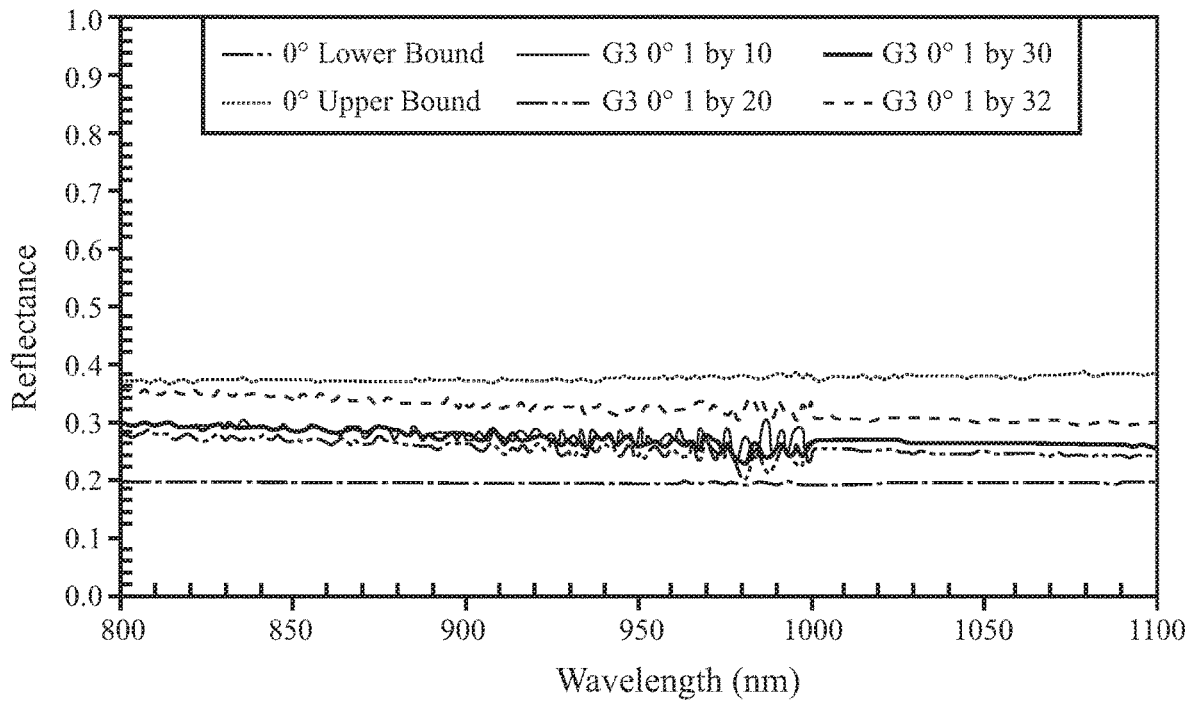
FIGS. 7A-H show the infrared reflectance of a concrete curb surrogate at various detection angles for a third color group and for different cement to paint ratios in an outermost layer of the skin.
Figure 7B:
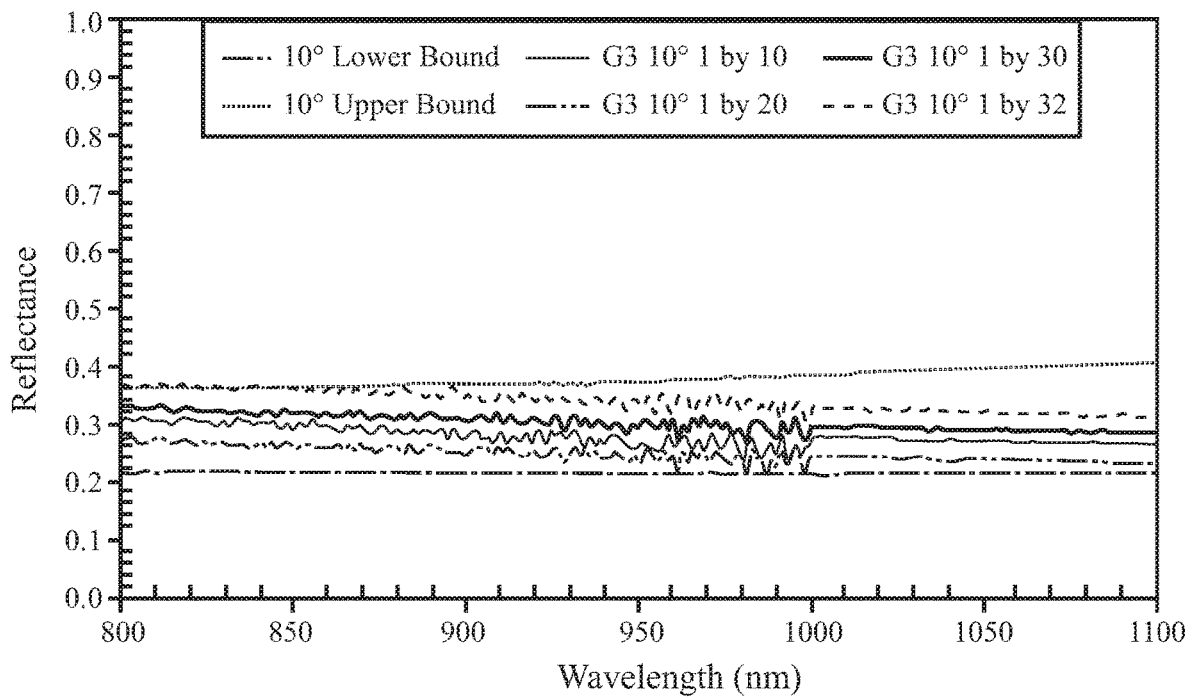
Figure 7C:
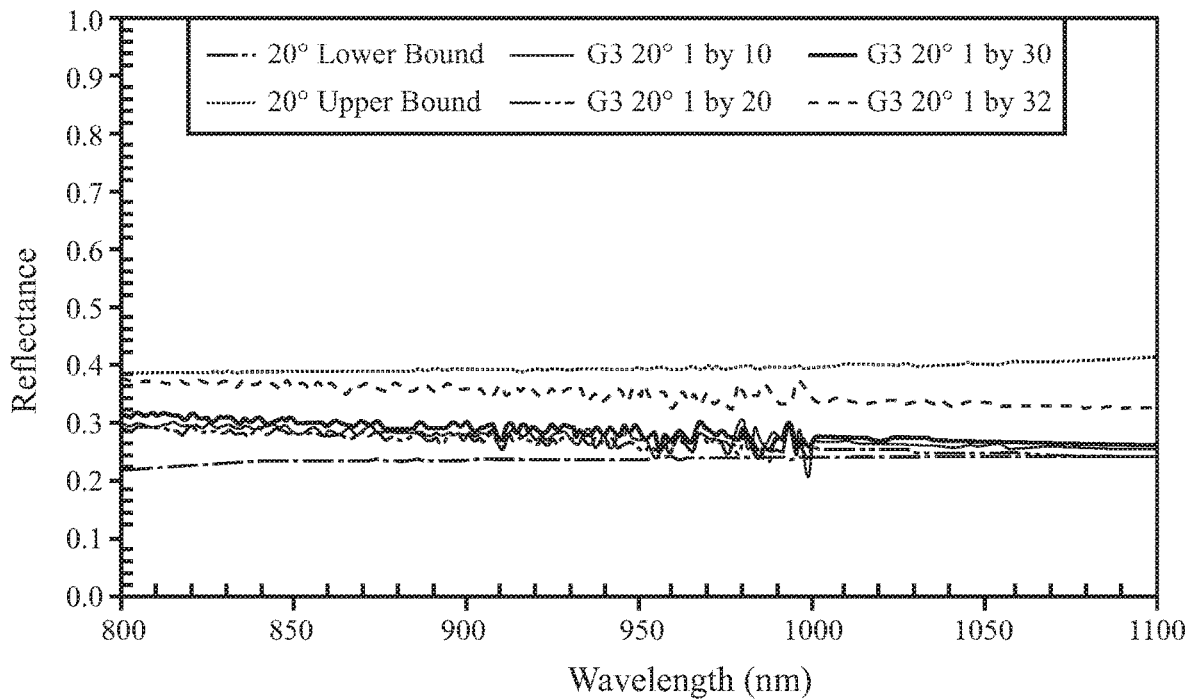
Figure 7D:
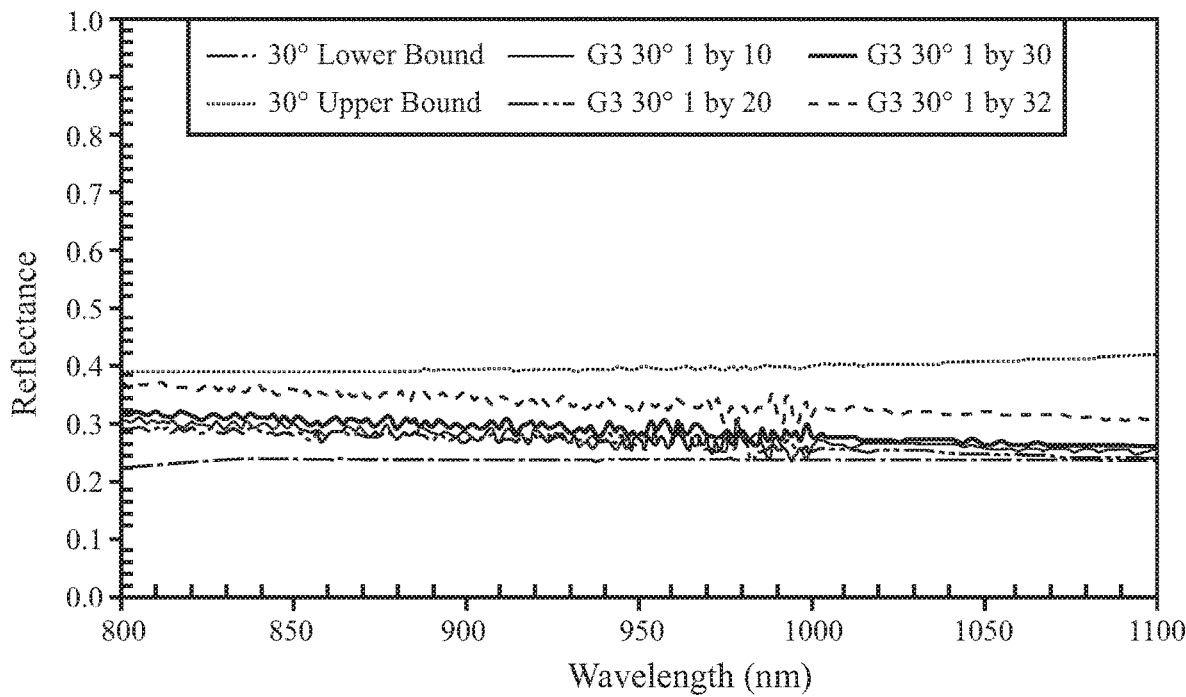
Figure 7E:
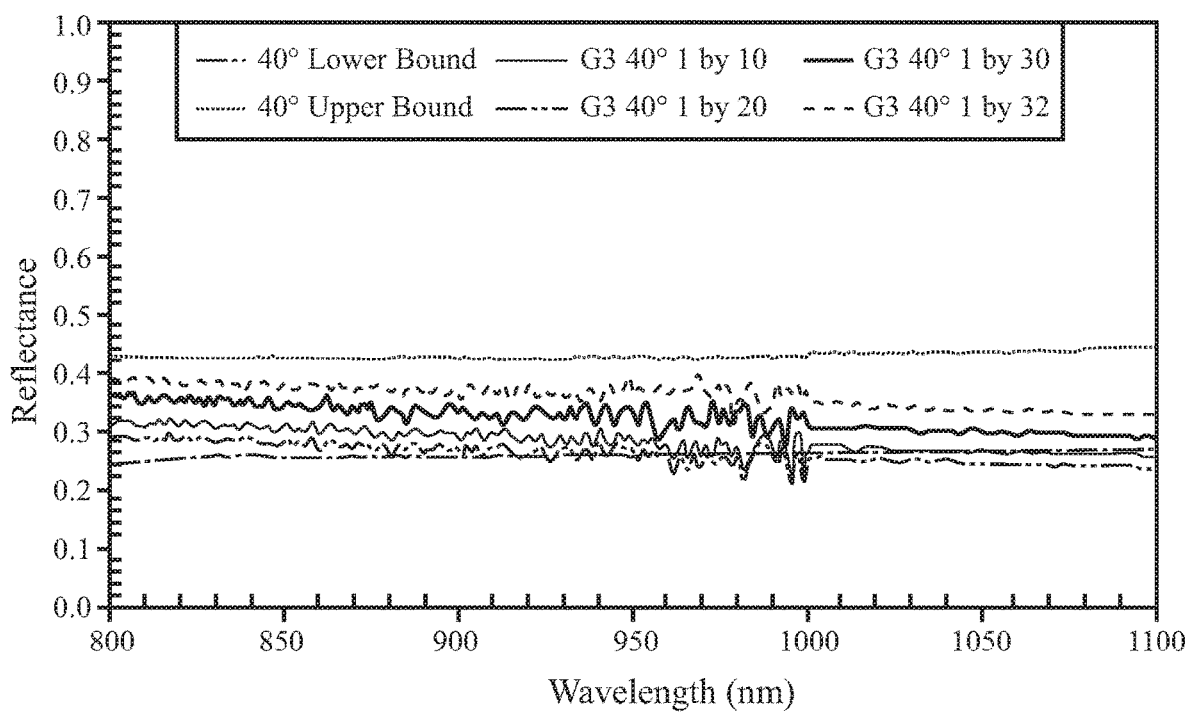
Figure 7F:
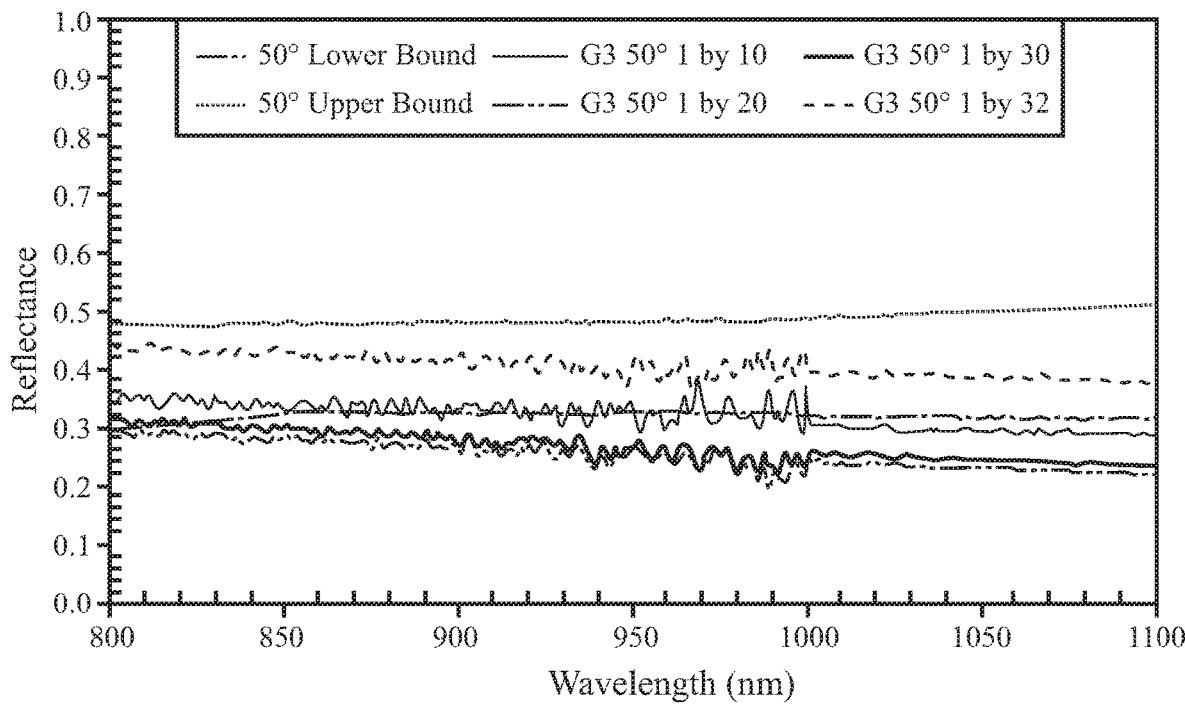
Figure 7G:
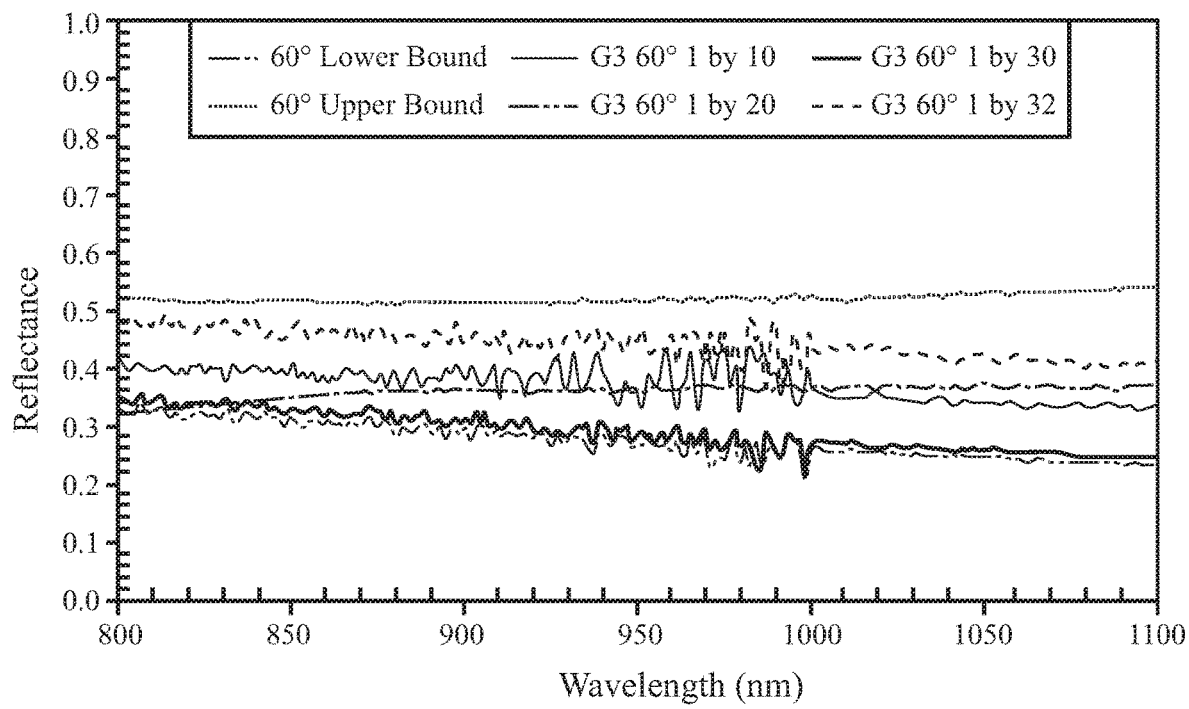
Figure 7H:
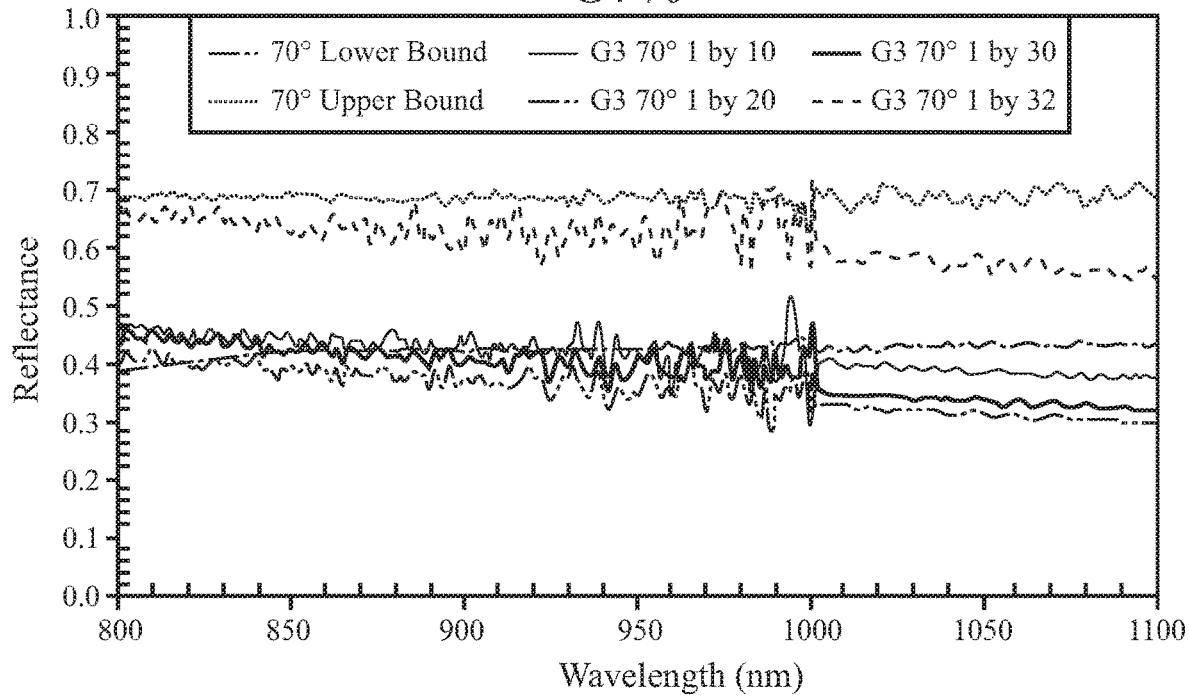

The skin 210 of the concrete curb surrogate 100 can be painted a color that substantially matches the color of the concrete curb that it is mimicking. Concrete curbs can be various colors. Based on a survey of concrete curbs throughout the United States, various commonly reoccurring colors were identified. Non-limiting examples of various example paint colors for the skin 210 of the concrete curb surrogate 100 that correspond to these commonly reoccurring colors are shown in FIG. 4A. The RGB (Red Green Blue) values of each color is provided in the table. The LAB values of each color are provided in the table. The LAB colors are based on the CIE 1976 L*a*b color space, as specified by the International Commission on Illumination (CIE) in 1976.

It should be noted that many real world concrete curbs are not of uniform color. This condition can arise due to variations in the material for the curb. It can also arise due to exposure to the elements, dirt, and/or other substances. In some instances, it can result from being damaged. Thus, the skin 210 of the concrete curb surrogate 100 can include color groupings and/or color patterns to more closely match the color and color pattern of the actual concrete curb that it is mimicking. There are various types of patterns that can be used. For instance, the patterns can include spots (dense or sparse), random shaped patches, other shapes, or any combination thereof. These patterns can be made of any of the colors listed in FIG. 4A.

FIG. 4B is a table of various example color groupings for the skin of the concrete curb surrogate. Each color grouping includes a combination of two or more of the colors in FIG. 4A. FIG. 4C is a table of various example paint patterns for the skin of the concrete curb surrogate. Each pattern is based on the groupings in FIG. 4B. FIG. 4C describes examples of ways in which the individual colors in the groupings can be distributed. Again, it will be appreciated that the colors, color grouping, and patterns can be selected based on the actual concrete curb that the curb surrogate 100 is trying to mimic.

Figure 8:
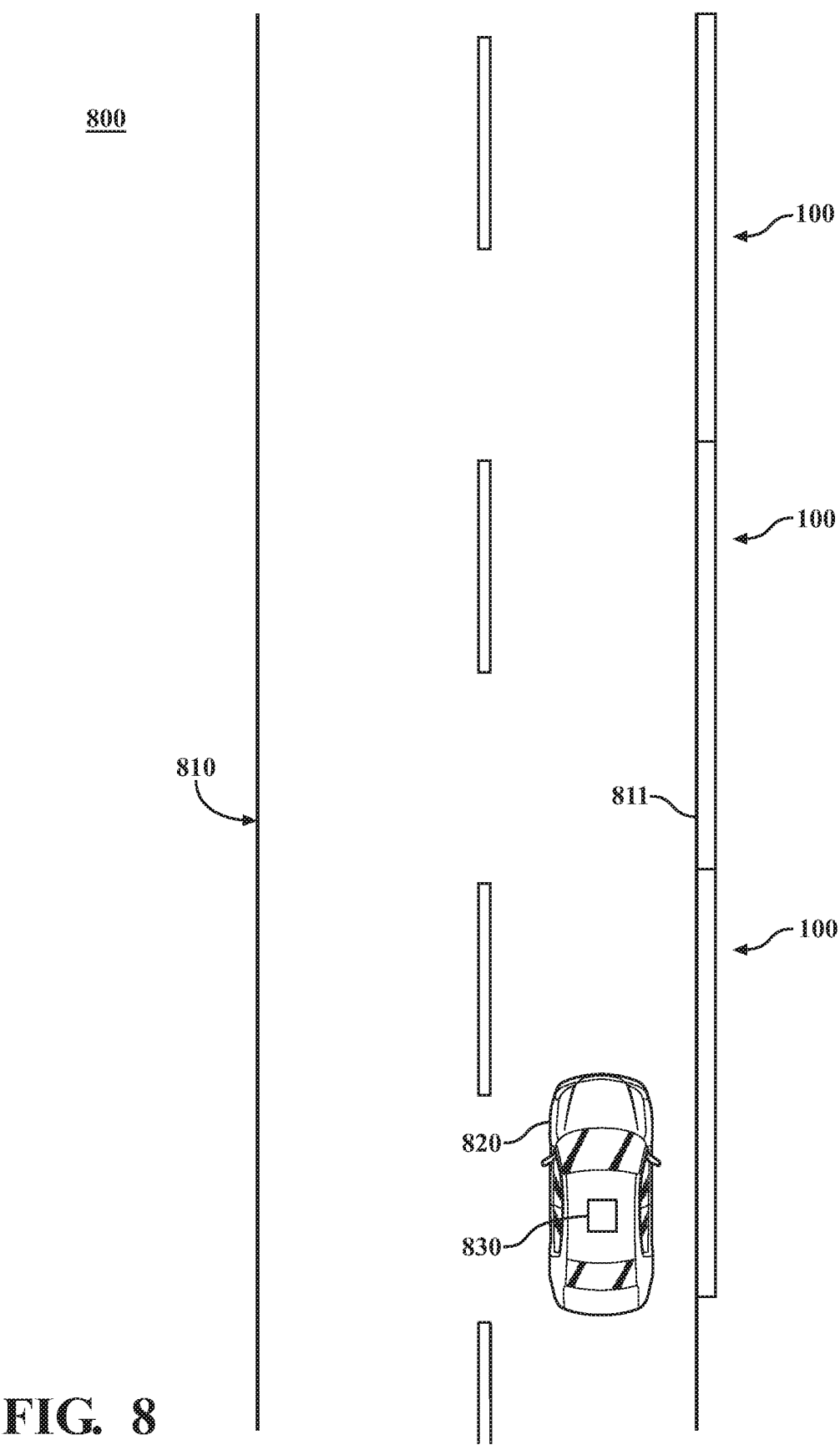
FIG. 8 is a view of an example of a vehicle testing environment.

The curb surrogate 100 can be formed by a single piece (FIG. 1). Alternatively, the curb surrogate 100 can be formed by a plurality of body segments 100' (FIG. 8). In such case, the body segments 100' can be operatively connected in an end-to-end manner.

One example arrangement of the curb surrogate 100 will be described in connection with FIG. 3. In this example, the core 200 can be made of cross-linked polyethylene foam. The skin 210 can have three layers. The first layer 220 can be made of a 32:1 mix of concrete colored paint and Portland cement. This mix of paint and cement can be applied in one or more layers. In this example, the first layer 220 is the outermost layer of the skin. The intermediate layer 240 can be made of polycarbonate film or a nonmetallic fabric material. The second layer 230 can be made of 8:1 mix of organic paint and conductive carbon paint. In one or more arrangements, this mix of paint can be applied in one or more coats.

Concrete curb surrogates as described herein have been tested relative to vehicle sensors. Test data showed that at least some configurations of the curb surrogate 100 exhibit substantially the same characteristics as the concrete curb relative to one or more vehicle sensors (e.g., camera(s), radar sensor(s), and/or LIDAR sensor(s)).

For instance, test data showed that at least some configurations of the curb surrogate 100 met infrared requirements in the detection angle range of 0 to 70 degrees, as is shown in FIGS. 5-7. Each of these figures will be discussed below.

FIGS. 5A-H show the infrared reflectance of a concrete curb surrogate at various detection angles for different cement to paint ratios (1:30, 1:32, and 1:45) in the first layer of the skin. Beginning with FIG. 5A, the detection angle is 0 degrees. In going from FIG. 5B to FIG. 5H, the detection angle increases in 10 degree increments to 70 degrees in FIG. 5H. In this example, the color of the concrete curb surrogate is color group 1 (FIG. 4B). In testing, the curb surrogate 100 with a cement to paint ratio of 1:32 met infrared requirements for 0 to 70 degrees.

FIGS. 6A-H show the infrared reflectance of a concrete curb surrogate at various detection angles for different cement to paint ratios (1:25, 1:30, and 1:32) in the first layer of the skin. Beginning with FIG. 6A, the detection angle is 0 degrees. In going from FIG. 6B to FIG. 6H, the detection angle increases in 10 degree increments to 70 degrees in FIG. 6H. In this example, the concrete curb surrogate is color group 3 (FIG. 4B). In testing, the curb surrogate 100 met infrared requirements for 0 to 70 degrees.

FIGS. 7A-H show the infrared reflectance of a concrete curb surrogate at various detection angles for different cement to paint ratios (1:10, 1:20, 1:30, and 1:32) in the first layer of the skin. In going from FIG. 7B to FIG. 7H, the detection angle increases in 10 degree increments to 70 degrees in FIG. 7H. In this example, the concrete curb surrogate is color group 4 (FIG. 4B). In testing, the curb surrogate 100 with a cement to paint ratio of 1:32 met infrared requirements for 0 to 70 degrees.

From the above FIGS. 5-7, the 1:32 cement to paint ratio performed the best for all colors. In these graphs, the reflectivity of the skin with the 1:32 cement to paint ratio fell within the upper and lower bounds. In some instances, the reflectivity of the skin with the 1:32 cement to paint ratio were near the upper bound. Commercial LIDAR sensors typically operate in the 800-1100 nm range. Within this range, the reflectivity of the skin with the 1:32 cement to paint ratio performed well.

In testing, the skin of the curb surrogate 100 met radar reflectivity requirements (e.g., −7.3±1 dB for 24 GHz and/or 77 GHz radar).

While a curb surrogate has been described above, it will be understood that the approaches described herein can generally be applied to create surrogates for other roadside objects, such as poles and tree trunks.

The surrogates described herein can be used for various purposes. For instance, the surrogates can be used in connection with the testing of vehicles. The vehicle can have a sensor system. The sensor system can include one or more sensors. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system includes a plurality of sensors, the sensors can work independently from each other. Alternatively, two or more of the sensors can work in combination with each other. In such case, the two or more sensors can form a sensor network. The sensor system and/or the one or more sensors can be operatively connected to processor(s), the data store(s), and/or other elements or systems of the vehicle. The sensor system can acquire data of at least a portion of the external environment of the vehicle.

The sensor system can include one or more environment sensors configured to acquire, detect, determine, assess, monitor, measure, quantify and/or sense driving environment data. "Driving environment data" includes and data or information about the external environment in which a vehicle is located or one or more portions thereof. For example, the one or more environment sensors can acquire data or information about obstacles in at least a portion of the external environment of the vehicle. In one or more arrangements, the sensor system can include one or more radar sensors, one or more LIDAR sensors, and/or one or more cameras.

The surrogates can be used on a test track or testing facility. The surrogates can be set up in an appropriate position with respect to the road. It should be noted that the curb surrogate be used on one or both sides of a road. Curb surrogates used on one side of the road can be substantially identical to curb surrogates used on the other side of the road, or they can be substantially mirror images of each other.

The concrete curb surrogate 100 can be used in a vehicle testing environment 800, as is shown in FIG. 8. The vehicle testing environment 800 can be, for example, a test track or a testing facility. The vehicle testing environment 800 can include a road 810 on which a test vehicle 820 can be driven, autonomously, semi-autonomously, and/or manually. The concrete curb surrogate 100 can be set up in an appropriate position with respect to the road 810. For example, the concrete curb surrogate 100 can be substantially adjacent to the road 810. For instance, the concrete curb surrogate 100 can be placed at an edge 811 of the road 810. In such case, the concrete curb surrogate 100 may define at least a portion of the edge 811 of the road 810 in that location.

While FIG. 8 shows the concrete curb surrogate 100 as being used on one side of the road 810, it will be understood that the concrete curb surrogate 100 can be used on one or both sides of the road 810. The concrete curb surrogate(s) 100 used on one side of a road can be substantially identical to the concrete curb surrogate(s) 100 used on the other side of the road, or they can be substantially mirror images of each other.

In some arrangements, one continuous concrete curb surrogate 100 can be used on a side of the road 810. Alternatively, there can be a plurality of concrete curb surrogates 100 on the side of the road 810. The plurality of concrete curb surrogates 100 can be substantially identical to each other. Alternatively, one or more of the plurality of concrete curb surrogates can be different from the other concrete curb surrogates in one or more respects, including in any respect described herein.

The plurality of concrete curb surrogates 100 can be arranged in any suitable manner. For instance, the concrete curb surrogates 100 can be substantially aligned with each other. In some or more arrangements, the plurality of concrete curb surrogates 100 can be arranged in an end-to-end manner such that the concrete curb surrogates abut each other. In some instances, two or more of the concrete curb surrogates 100 can be operatively connected to each other in any suitable manner, including, for example, one or more adhesives, one or more forms of mechanical engagement, and/or one or more fasteners.

During testing, the test vehicle 820 can move along the road 810. One or more sensors 830 of the test vehicle 820 can acquire driving environment data, including data about the concrete curb surrogate 100. For instance, the test vehicle 820 can acquire data about the concrete curb surrogate 100 using camera(s), radar sensor(s), and/or LIDAR sensor(s). Due to the construction of the concrete curb surrogate 100, the data of the concrete curb surrogate 100 acquired by the sensor(s) 830 can mimic the sensor data that would be acquired by the sensor(s) 830 of an actual concrete curb in a real world driving environment. The acquired driving environment data can be processed and/or analyzed, such as by one or more processors, to determine an appropriate action.

If the test vehicle 820 veers off of the road 810 and onto the concrete curb surrogate 100, damage to the test vehicle 820 and/or the concrete curb surrogate 100 can be avoided and/or minimized. Thus, the concrete curb surrogate 100 can continue to be used in future tests. The concrete curb surrogate 100 can help the test vehicle 820 to distinguish the boundaries of the road 810, particularly in those portions of the road 810 that do not include lane markings.

The vehicle can move along the test track and the sensor system can acquire driving environment data, including data about the curb surrogate, using the camera(s), the radar sensor(s), and the LIDAR sensor(s). Due to the construction of the curb surrogate, the data of the curb surrogate acquired by the sensor system can mimic the sensor data that would be acquired by the sensor system in a real world driving environment. The vehicle can process the sensor data to determine an appropriate action. However, if for some reason, the vehicle does not detect the curb surrogate and the vehicle collides with the curb surrogate, damage to the vehicle and the curb surrogate is avoided due to the construction of the curb surrogate. The curb surrogate can be readily set up again and further testing can be performed.

As an example, the surrogates described herein can be used in connection with the testing of the sensors and/or systems of an automated vehicle. "Automated vehicle" means a vehicle that configured to operate in an autonomous operational mode in which one or more computing systems are used to navigate and/or maneuver the vehicle along a travel route with minimal or no input from a human driver. In one or more arrangements, the automated vehicle can be highly automated or completely automated. As another example, the surrogates described herein can be used to test road departure mitigation systems in vehicles.

It will be appreciated that arrangements described herein can provide numerous benefits, including one or more of the benefits mentioned herein. For example, arrangements described herein can provide surrogates that appear to be visually realistic to their counterpart roadside objects. Arrangements described herein can provide surrogates that mimic their corresponding roadside object with respect to one or more sensors. Arrangements described here enable the surrogates to be used in vehicle testing, particularly the testing of road departure systems. Arrangements described herein can be crashed into during testing, thereby avoiding damage to the test vehicle. Arrangements described herein can be used for internal testing and to support upcoming European New Car Assessment Programme (EUNCAP) requirements for road departure systems and potential future U.S. and other global testing requirements.

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible.

What is claimed is:

1. A concrete curb surrogate comprising:
a body configured to have a size and a shape that is substantially the same as a size and a shape as a body of a concrete curb, the body including a core and a skin attached to the core, the skin covering at least a portion of the core, the skin including a plurality of layers, the plurality of layers including at least: a first layer and a second layer, the first layer including a mixture of paint and cement, and the second layer including a conductive material.

2. The concrete curb surrogate of claim 1, wherein the conductive material is conductive paint.

3. The concrete curb surrogate of claim 1, wherein the second layer includes a mixture of organic paint and conductive paint.

4. The concrete curb surrogate of claim 3, wherein the organic paint and the conductive paint are present in a ratio of about 8:1.

5. The concrete curb surrogate of claim 1, wherein the conductive material is conductive fabric or conductive film.

6. The concrete curb surrogate of claim 1, wherein the conductive material is conductive foam.

7. The concrete curb surrogate of claim 1, wherein the first layer includes at least one of concrete colored paint and Portland cement.

8. The concrete curb surrogate of claim 1, wherein the first layer includes at least one of concrete colored paint and one or more chemical components of Portland cement.

9. The concrete curb surrogate of claim 1, wherein the paint and the cement are present in a ratio of about 32:1.

10. The concrete curb surrogate of claim 1, further including an intermediate layer, and wherein the intermediate layer is located between the first layer and the second layer.

11. The concrete curb surrogate of claim 10, wherein the intermediate layer includes polycarbonate.

12. The concrete curb surrogate of claim 10, wherein the intermediate layer includes a nonmetallic fabric.

13. The concrete curb surrogate of claim 12, wherein the nonmetallic fabric includes at least one of polyester fabric, cotton fabric, and nylon fabric.

14. The concrete curb surrogate of claim 1, wherein the body is made of a plurality of body segments, and wherein the plurality of body segments are operatively connected in an end to end manner.

15. The concrete curb surrogate of claim 1, wherein the core is made of a foam material.

16. The concrete curb surrogate of claim 1, wherein the first layer defines an outermost layer of the plurality of layers of the skin, and wherein the second layer defines an innermost layer of the plurality of layers of the skin.

17. The concrete curb surrogate of claim 1, wherein the body has a substantially rectangular cross-sectional shape with four corners, and wherein at least one of the corners is rounded.

18. The concrete curb surrogate of claim 1, wherein the skin is configured to exhibit substantially the same radar reflectivity as a concrete curb for 77 GHz radar.

19. The concrete curb surrogate of claim 1, wherein the skin is configured to exhibit substantially the same infrared reflectivity as a concrete curb a reflectance angle of from substantially 0 degrees to substantially 70 degrees.

20. A surrogate for a concrete curb for use in vehicle testing, the surrogate comprising:

a body configured to have a size and a shape that is substantially the same as a size and a shape as a body of a concrete curb, the body including a core and a skin attached to the core, the core including a foam material, the skin covering at least a portion of the core, the skin including at least three layers, the at least three layers including:

a first layer including a mixture of paint and cement, the first layer being an outermost layer of the at least three layers;

a second layer including a conductive material; and an intermediate layer located between the first layer and the second layer.

21. The surrogate of claim 20, wherein the intermediate layer includes a nonmetallic material.

22. The surrogate of claim 20, wherein the second layer defines an innermost layer of the at least three layers.

23. The surrogate of claim 20, wherein the body has a substantially rectangular cross-sectional shape with four corners, and wherein at least one of the corners is rounded.

24. A surrogate for a concrete curb for use in vehicle testing, the surrogate comprising:

a body configured to have a size and a shape that is substantially the same as a size and a shape as a body of a concrete curb, the body having a substantially rectangular cross-sectional shape with four corners, at least one of the corners being rounded, the body including a core and a skin attached to the core, the core including a foam material, the skin covering at least a portion of the core, the skin including at least three layers, the at least three layers including:

a first layer, the first layer being an outermost layer of the at least three layers, the first layer including concrete colored paint and a chemical component of Portland cement;

a second layer, the second layer being an innermost layer of the at least three layers, the second layer including at least one of: a conductive fabric, a conductive film, and conductive foam; and an intermediate layer located between the first layer and the second layer, the intermediate layer including a nonmetallic fabric.

* * * * *